(12) United States Patent
Shapiro et al.

(10) Patent No.: US 9,132,913 B1
(45) Date of Patent: Sep. 15, 2015

(54) SIMPLIFIED AUTO-FLIGHT SYSTEM COUPLED WITH A TOUCHSCREEN FLIGHT CONTROL PANEL

(71) Applicants: Geoffrey A. Shapiro, Cedar Rapids, IA (US); Timothy J. Etherington, Hampton, VA (US); Laura Maxine Smith-Velazquez, Owings Mills, MD (US)

(72) Inventors: Geoffrey A. Shapiro, Cedar Rapids, IA (US); Timothy J. Etherington, Hampton, VA (US); Laura Maxine Smith-Velazquez, Owings Mills, MD (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 14/038,439

(22) Filed: Sep. 26, 2013

(51) Int. Cl.
  *G05D 1/00* (2006.01)
  *G09G 5/00* (2006.01)
  *B64C 19/00* (2006.01)

(52) U.S. Cl.
  CPC .................................... *B64C 19/00* (2013.01)

(58) Field of Classification Search
  USPC ............................................. 701/4; 345/633
  See application file for complete search history.

(56) References Cited

U.S. PATENT DOCUMENTS

| | | |
|---|---|---|
| 4,725,956 A | 2/1988 | Jenkins |
| 5,818,423 A | 10/1998 | Pugliese et al. |
| 5,926,790 A | 7/1999 | Wright |
| 5,974,384 A | 10/1999 | Yasuda |
| 6,173,192 B1 | 1/2001 | Clark |
| 7,024,309 B2 * | 4/2006 | Doane ......................... 701/301 |
| 7,089,108 B2 | 8/2006 | Merritt |
| 7,415,326 B2 | 8/2008 | Komer et al. |
| 7,606,715 B1 | 10/2009 | Krenz |
| 7,809,405 B1 | 10/2010 | Rand et al. |
| 7,881,832 B2 | 2/2011 | Komer et al. |
| 7,912,592 B2 | 3/2011 | Komer et al. |
| 8,139,025 B1 | 3/2012 | Krenz |
| 8,234,121 B1 | 7/2012 | Swearingen |
| 8,311,827 B2 | 11/2012 | Hernandez et al. |
| 8,515,763 B2 | 8/2013 | Dong et al. |
| 8,694,184 B1 * | 4/2014 | Boorman et al. ............... 701/14 |
| 8,761,971 B2 * | 6/2014 | Gershzohn ..................... 701/11 |
| 2003/0110028 A1 | 6/2003 | Bush |
| 2005/0055143 A1 * | 3/2005 | Doane ........................... 701/30 |
| 2005/0203700 A1 | 9/2005 | Merritt |

(Continued)

OTHER PUBLICATIONS

Croft, John, et al., "Mode Masters", Aviation Week & Space Technology, Apr. 22, 2013, pp. 42-44.

(Continued)

*Primary Examiner* — Thomas G Black
*Assistant Examiner* — Tyler Paige
(74) *Attorney, Agent, or Firm* — Angel N. Gerdzhikov; Donna P. Suchy; Daniel M. Barbieri

(57) ABSTRACT

A system includes an auto-flight system and a touchscreen flight mode control panel. The auto-flight system is configured to control a plurality of primary flight modes. The touchscreen flight mode control panel is communicatively coupled to the auto-flight system. The touchscreen flight mode control panel is configured to receive primary flight mode data from the auto-flight system. The touchscreen flight mode control panel is also configured to graphically present each primary flight mode of the plurality of primary flight modes to a user. The touchscreen flight mode control panel is further configured to detect touch gestures and direct executions of the user. The touchscreen flight mode control panel is additionally configured to output touch gesture data and direct execution data to the auto-flight system.

11 Claims, 28 Drawing Sheets

(56) References Cited

U.S. PATENT DOCUMENTS

| | | | |
|---|---|---|---|
| 2007/0288242 A1 | 12/2007 | Spengler et al. | |
| 2008/0065275 A1 | 3/2008 | Vizzini | |
| 2010/0030400 A1 | 2/2010 | Komer et al. | |
| 2010/0292873 A1* | 11/2010 | Duggan et al. | 701/11 |
| 2011/0118908 A1* | 5/2011 | Boorman et al. | 701/14 |
| 2012/0026190 A1* | 2/2012 | He et al. | 345/633 |
| 2013/0179009 A1* | 7/2013 | Gershzohn | 701/3 |

OTHER PUBLICATIONS

Vakil, Sanjay S., et al., "Approaches to Mitigating Complexity-driven issues in commercial autoflight systems", Reliability Engineering and System Safety, 75 (2002), pp. 133-145, Elsevier Science Ltd., 2002.

Degani, Asaf, et al., "Modes in Automated Cockpits: Problems, Data Analysis, and a Modeling Framework", 36th Israel Annual Conference on Aerospace Sciences, Feb. 21-22, 1996, 16 pages.

Schutte, Paul C., et al., "The Naturalistic Flight Deck System: An Integrated System Concept for Improved Single-Pilot Operations", National Aeronautics and Space Administration, Hampton, VA, Dec. 2007, 63 pages.

U.S. Appl. No. 13/248,814, filed Sep. 29, 2011, Barber.

U.S. Appl. No. 14/013,883, filed Aug. 29, 2013, Shapiro.

* cited by examiner

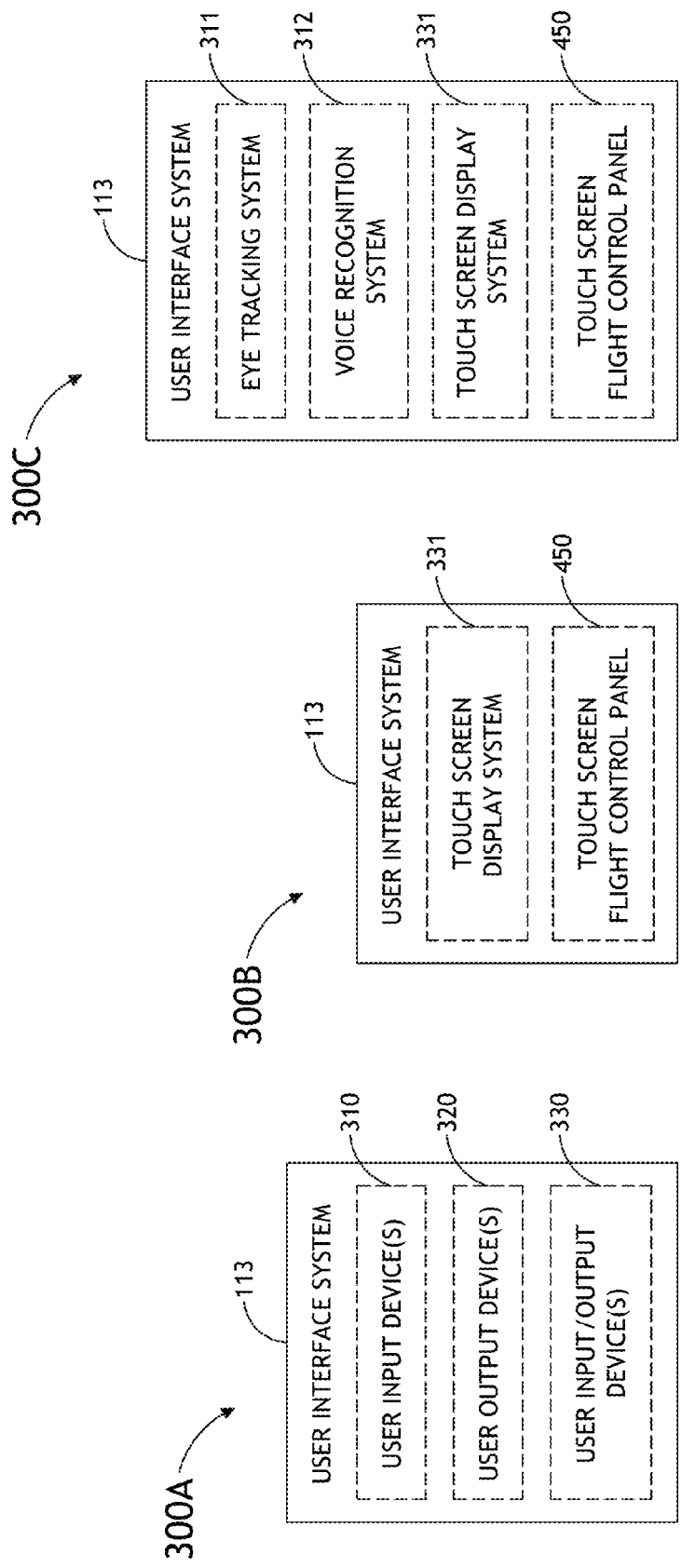

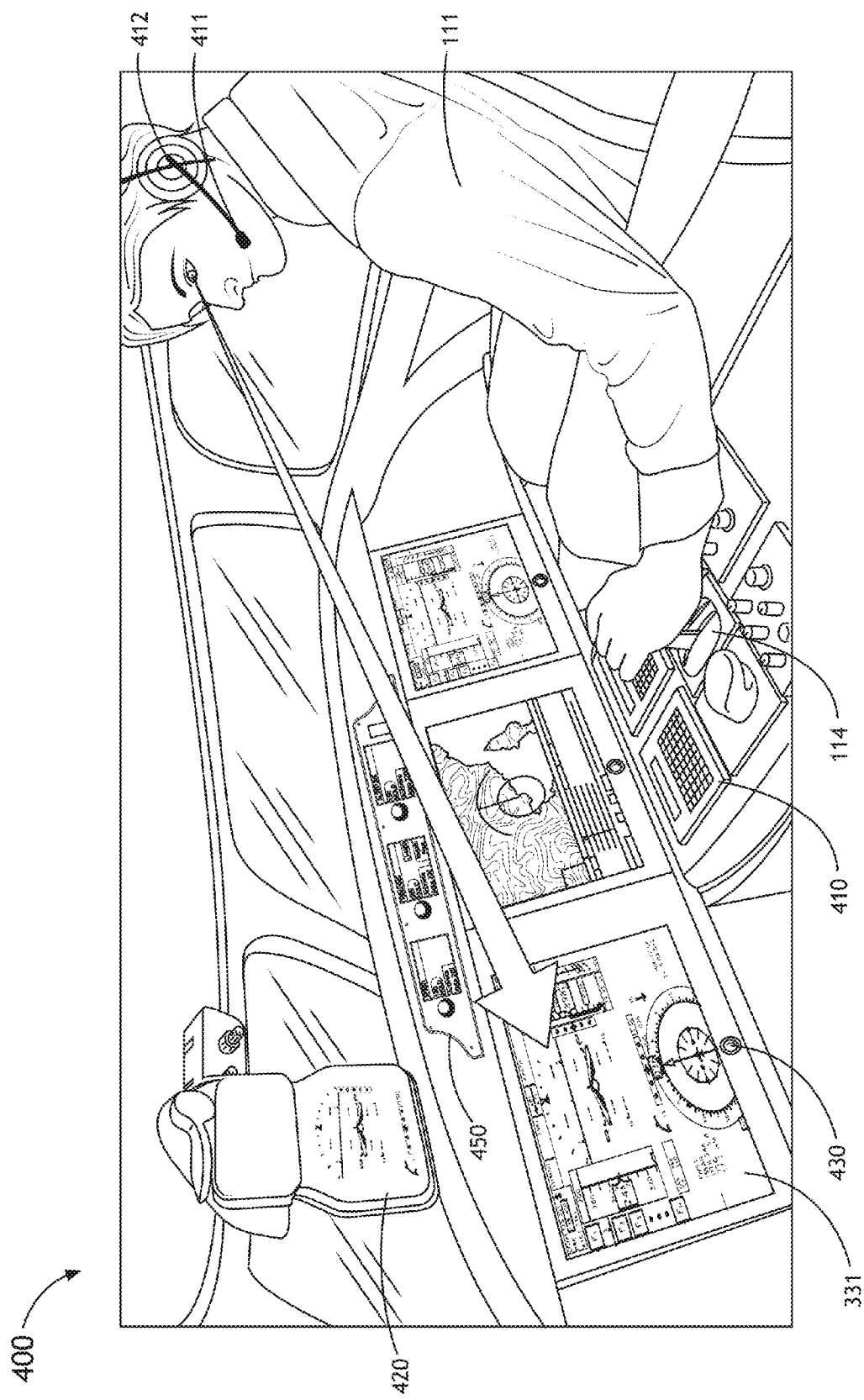

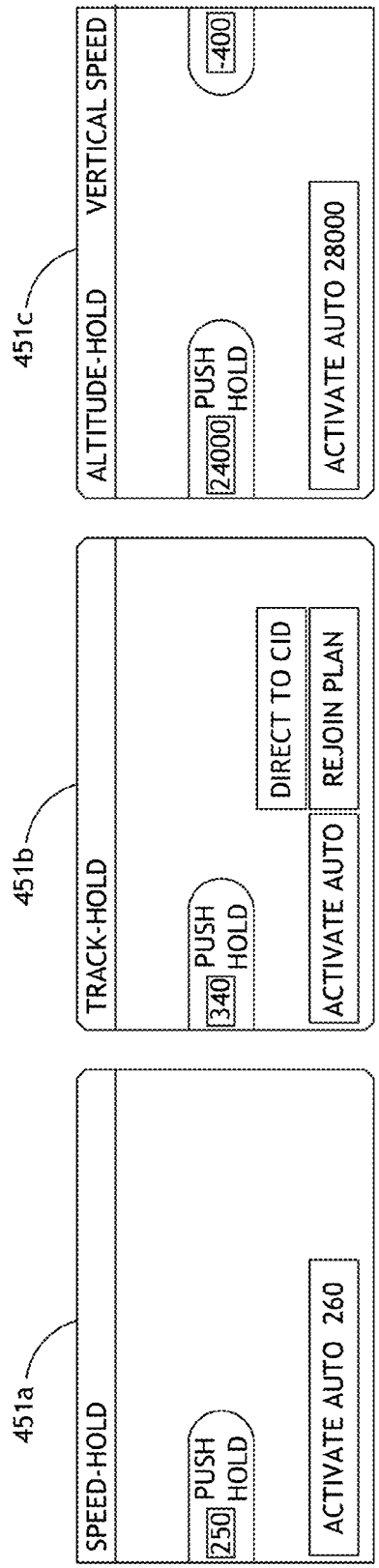

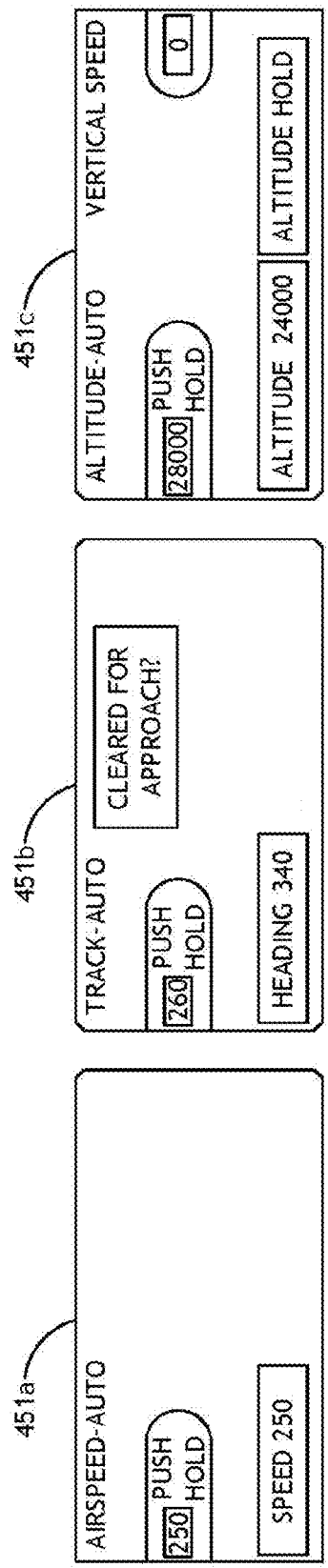

AVAILABLE ACTIVE MODES:
WSHR, EDM, USPD, LIM, RETARD, GA, HOLD, TO, SPD, THRUST
APPR VOR #, APPR LOC #, APPR FMS #, B/C #, LOC #, VOR #, FMS #, GA, TO, HDG, ROLL
WSHR, EDM, USPD, USPD, GS, ALTV, ALTS, ALT, ALTx CAP, GA, TO, FLC, VS, FPA
AP#, TCS, SYNC

ACTIVE MODES: XXXXXX | XXXX | XXXXXX | AP# | XXXXX
ACTIVE MODES: XXXXXX | XXXX | XXXXXX | AT# | XXXX | XXXX  ⎬ 503

AVAILABLE ARMED:
TO, SPD
APPR VOR #, APPR LOC #, APPR FMS #, B/C #, LOC #, VOR #, FMS #
AT#, ALT TV PATH VGP, ALTS, VNAV GS, ALT, FLC, VS, FPA
+XXXX
-X.X

SIMPLIFIED AUTO-FLIGHT SYSTEM COUPLED WITH A TOUCHSCREEN FLIGHT CONTROL PANEL

CROSS-REFERENCE TO RELATED APPLICATIONS

The present application is related to U.S. patent application Ser. No. 14/038,406, filed on Sep. 26, 2013; the present application is related to U.S. patent application Ser. No. 29/468,159, filed on Sep. 26, 2013.

TECHNICAL FIELD

Embodiments of the invention are directed generally to human-machine interfaces, auto-flight systems, and flight management systems associated with aircraft.

BACKGROUND

Existing auto-flight systems and existing flight management systems are very complicated to operate and utilize non-intuitive interfaces. The non-intuitive nature of existing auto-flight systems and existing flight management systems often results in unintended flight mode activations and surprises. Operating existing auto-flight systems and existing flight management systems has become increasingly complicated and challenging for both new and very experienced pilots. Additionally, existing auto-flight systems and existing flight management systems require intense demands on pilots to be aware of particular flight situations and conditions while operating these complicated flight systems. Pilots' inability to consistently understand and continuously be aware of the complexities and non-intuitiveness of automation of existing avionics systems has resulted in safety concerns and accidents. Complex flight mode logic of existing auto-flight systems and existing flight management systems can make it difficult for pilots to train and understand flight modes of current systems. Also, existing systems poorly annunciate to the pilot what automated activities are being performed or are about to be performed; as such, the poor flight mode annunciation often results in flight mode automation surprise (such as overflown flight plans due to unnoticed automatic mode changes). For example, the large number of flight modes to know, the poor annunciation of the flight modes, and the pilot awareness needed in an in-flight environment often result in pilot confusion while trying to operate current flight management systems and auto-flight systems. Additionally, control of existing flight management system flight modes is often so time consuming that pilots abort automation in favor of basic auto-flight modes. Furthermore, it is currently a problem that pilots are limited to engaging an active-pilot mode or an autopilot-armed mode, whereby the pilot is constrained to engaging in either the active-pilot mode or the autopilot-armed mode in a rigid "all-or-none" manner; this limitation of current systems fails to provide pilots flexibility for specific circumstances and flight conditions.

Therefore, it would be desirable to provide a method, system, and apparatus configured to reduce the number of auto-flight modes, reduce training requirements, better align aviation systems with pilot goals, replace or improve traditional flight control panels, integrate mode feedback and flight management information, calculate and display optimized navigation intercepts, graphically demonstrate automation effects to a pilot, resolve pilot goal performance conflicts, and provide at least some variable or adjustable pilot control to the degree to which particular flight modes are armed.

SUMMARY

Accordingly, an embodiment includes a system. The system includes an auto-flight system and a touchscreen flight mode control panel. The auto-flight system is configured to control a plurality of primary flight modes. The touchscreen flight mode control panel is communicatively coupled to the auto-flight system. The touchscreen flight mode control panel is configured to receive primary flight mode data from the auto-flight system. The touchscreen flight mode control panel is also configured to graphically present each primary flight mode of the plurality of primary flight modes to a user. The touchscreen flight mode control panel is further configured to detect touch gestures and direct executions of the user. The touchscreen flight mode control panel is additionally configured to output touch gesture data and direct execution data to the auto-flight system.

Additional embodiments are described in the application including the claims. It is to be understood that both the foregoing general description and the following detailed description are exemplary and explanatory only and are not restrictive. Other embodiments of the invention will become apparent.

BRIEF DESCRIPTION OF THE DRAWINGS

Other embodiments of the invention will become apparent by reference to the accompanying figures in which:

FIGS. 3A-C show exemplary diagrams of user interface systems of some embodiments;

FIG. 4A shows a partial view of an exemplary cockpit of an aircraft;

FIGS. 4D-K show exemplary screenshots of touch graphical user interfaces of the exemplary touchscreen flight control panel 450;

FIGS. 5A-B show depictions of current avionic systems;

DETAILED DESCRIPTION

Figure 1:
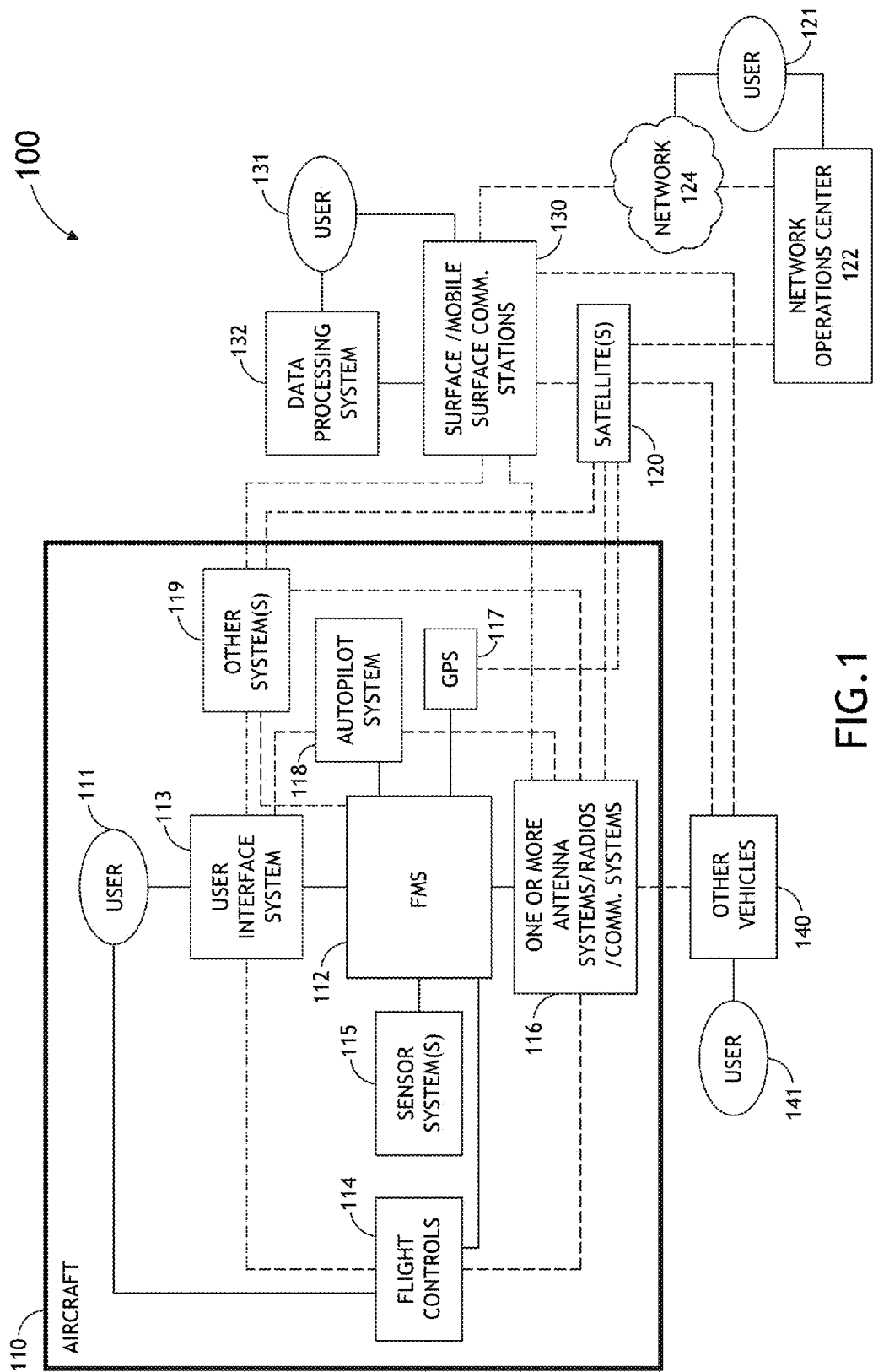
FIG. 1 shows an exemplary system topology.

Reference will now be made in detail to the subject matter disclosed, which is illustrated in the accompanying drawings.

The scope of embodiments of the invention is limited only by the claims; numerous alternatives, modifications, and equivalents are encompassed. For the purpose of clarity, technical material that is known in the technical fields related to the embodiments has not been described in detail to avoid unnecessarily obscuring the description.

Embodiments of the invention include a method, system, and apparatus configured to simplify the auto-flight system, the flight management system, and/or a flight mode control panel. Some embodiments are configured to: reduce the number of auto-flight modes, which can reduce training requirements while aligning with pilot goals; integrate mode feedback and flight management information into a flight control panel; calculate and display optimized navigation intercepts; graphically demonstrate automation effects to a pilot; resolve pilot goal performance conflicts; and provide variable or adjustable control as to the degree to which particular flight modes are armed. Additionally, some embodiments include a context sensitive or context driven touchscreen flight control panel configured to present information and graphics which are relevant to particular flight condition.

Embodiments of the invention provide solutions to many of the complexities and problems associated with currently implemented auto-flight systems and mode control panels. For example, some embodiments of the invention reduce the number of auto-flight modes needed to be known to operate an auto-flight system; this reduction in the number of auto-flight modes reduces the amount of time to train a pilot, pilot student, air traffic controller, or the like with respect to a particular auto-flight system and an associated flight control panel. Additionally, the reduction of auto-flight modes aligns with pilot goals by, for example, allowing the pilot to maintain and shift appropriate amounts of attention between flight system awareness, flight environment awareness (e.g., observing flight conditions, looking through the cockpit, or communicating with a copilot, air traffic controller, flight attendants, or passengers), or the like, as may be dictated by circumstances of any particular situation.

Additionally, some embodiments of the invention are configured to replace, upgrade, or augment current flight control panels with one or more coupled devices or systems (e.g., a user interface system (such as a touchscreen display system or touchscreen flight mode control panel), a flight management system, an auto-flight system, and/or the like), a method, software, or a service (e.g., an air traffic control service, a navigation service, a flight service, a data service, a network service, a communications service, or the like) configured to present contextually sensitive and/or contextually driven content to a pilot (or other user, such as an air traffic controller). In some embodiments, contextually sensitive or driven content comprises content (e.g., output content of a function, process, or operation of a system (such as a flight management system, data processing system (such as an air traffic control data processing system), an auto-flight system, or the like)). As such, the contextually sensitive and/or contextually driven content may be associated with a particular flight condition or other relevant factor such that the contextually sensitive and/or contextually driven content is configured to be presented to a user when (e.g., when, only when, if, only if, if and only if, or the like) the output content is applicable to an incident flight condition or other incident relevant factor (e.g., a probabilistically incident, likely to be incident, predicted to be incident, or detected to be incident); that is, for example, contextually sensitive or driven content associated with a particular flight system function, process, or operation may be displayed on a user interface system based upon an occurrence, determination, or detection of a specific flight condition as being applicable to a particular user (such as a pilot), a decision to be made by a user, or to a user's awareness.

Additionally, some embodiments include a device, a system, a method, software, or a service configured to integrate mode feedback and flight management information into existing flight control panels; other embodiments are configured to perform operations to integrate mode feedback and flight management information into a flight control system, which may include a flight control panel.

Furthermore, some embodiments include a device, a system, a method, software, or a service configured to perform calculate, output, and present (e.g., display) improved navigation intercepts (e.g., navigation intercepts which are improved as compared to another particular flight plan, substantially optimized, optimized based upon a set of predetermined constraints, optimized, or the like).

Additionally, some embodiments include a device, a system, a method, software, or a service configured to graphically demonstrate automation effects to a pilot (or other user, such as an air traffic controller).

Additionally, some embodiments include a device, a system, a method, software, or a service configured to resolve goal performance conflicts (e.g., goal performance conflicts of, between, or among one or more of a set of at least one user (e.g., a pilot, an air traffic controller, or the like), at least one system (e.g., an aircraft system, an air traffic control system, or the like), at least one process, at least one environment, or the like).

Referring now to FIG. 1, an exemplary system topology 100 associated with exemplary embodiments of the invention is depicted. In exemplary embodiments as depicted in FIG. 1, the system topology 100 includes an aircraft 110, one or more satellites 120, one or more surface/mobile surface communication stations 130, and one or more other vehicles 140. In exemplary embodiments, the aircraft 110, the one or more satellites 120, the one or more surface/mobile surface communication stations 130, and the one or more other vehicles 140 are configured to be communicatively coupled to each other. Additionally, a connection between any two (or among more than two) of the aircraft 110, the one or more satellites 120, the one or more surface/mobile surface communication stations 130, and the one or more other vehicles 140 may be configured to be communicatively connected some of the time or all of the time (e.g., particular communication connections may be turned on or off at any given time, may lose or regain connectivity at any given time, or may remain connected for at least substantially all of a duration of time).

In exemplary embodiments as shown in FIG. 1, the aircraft 110 includes a plurality of subsystems and at least one user 111 (such as a pilot). As exemplarily depicted in FIG. 1, the plurality of subsystems include at least one flight management system 112; at least one user interface system 113; at least one flight controls 114; at least one sensor system 115; one or more antenna systems, radio systems, or communication systems 116; at least one global positioning system (GPS) 117; at least one autopilot system 118; other systems 119, or the like. In some embodiments, the at least one autopilot system 118 comprises an automatic flight control system ("auto-flight system"). Each system or subsystem of the aircraft may include one or more communicatively coupled components, such as any of the following: electrical components, electronic components, computer components, communications components, avionic components, navigational components, mechanical components, hydraulic components, pneumatic components, electro-mechanical components, sensors, optical components, acoustical components, or the like. For example, exemplary computer components may include one or more processors, memory, storage, cache, buffers, busses, software or computer code stored or loaded in a repository (such as storage, a cache, a buffer, a memory, or the like), networking components (such as a wired or wireless network card, one or more antennas, fiber optic cables, wires, or the like), or the like.

In some embodiments, it is further contemplated that a particular user of the aircraft 110 may comprise a remote user (e.g., a remote pilot, remote co-pilot, a remote operator, a remote co-operator, a remote co-navigator, a remote air traffic control user, a user of another vehicle, or the like), an automated computerized process, a semi-automated computerized process (e.g., a user-overridable computerized process), or some combination of at least one on-board user, at least one remote user, or at least one computerized process. For example, under some circumstances a remote user (e.g., an air traffic control user or a user of another vehicle) may be authorized (e.g., upon the occurrence of a predefined condition or otherwise) to remotely propose a flight path or plan, remotely direct a flight path or plan, remotely control the flight controls (such as via the flight management system 112), or remotely control the auto pilot system 118 of a particular aircraft. It is further contemplated in some embodiments that one or more systems of the aircraft 110 may be applied to vehicles other than aircraft or spacecraft.

In exemplary embodiments, the one or more communication stations 130 are communicatively coupled to at least one data processing system 132. In particular embodiments, the one or more communication stations 130 are further communicatively coupled to the one or more satellites 120, the aircraft 110, and to other vehicles 140. In contemplated embodiments, the one or more communication stations 130 comprise an air traffic control (ATC) communication station (e.g., an air traffic control tower and associated communications equipment (such as radio transmitters/receivers)); likewise, in some contemplated embodiments, the data processing system 132 comprises an air traffic control (ATC) data processing system 132. In some embodiments, the data processing system 132 and/or the one or more communication stations 130 include at least one user-interface system for at least one user 131. In contemplated embodiments, the at least one user 131 comprises at least one air traffic control (ATC) user (e.g., an air traffic controller). Additionally, in some embodiments communication station 130 may include or be communicatively coupled to a network operations center (NOC) 122; the NOC 122 may connect a particular type of communications (e.g., satellite communications or a particular satellite network) with one or more networks 124 (e.g., the internet, a portion of the internet (such as a particular or a secured optical fiber network), an intranet, or the like).

Still referring to FIG. 1, in some embodiments, the system topology 100 includes one or more other vehicles 140. The other vehicles 140 may be communicatively coupled to the aircraft 110, one or more satellites 120, one or more communication stations 130, one or more data processing systems 132, or the like. Additionally, it is contemplated that the aircraft 110 and the other vehicles 140 may be communicatively connected as an ad hoc network (such as a mobile ad hoc network). In some embodiments, at least one user 141 is configured to control one or more functions of a particular other vehicle 140; for example, the user 141 may comprise a driver, a navigator, a pilot, a copilot, a remote pilot, a remote copilot, an operator, a co-operator, a remote operator, a remote co-operator, or the like. It is further contemplated that in some embodiments, the other vehicles 140 may lack an on-board user, such that the other vehicles 140 are controlled by a remote pilot, a semi-automated computerized process, an automated computerized process, or some combination thereof.

For example, in some embodiments, one or more other vehicles 140 can comprise any number of aircraft (e.g., helicopters, airplanes, unmanned aircraft, blimps, or the like), spacecraft, surface vehicles (e.g., automobiles, trains, tanks, or the like), subterranean vehicles (e.g., subways, or the like), amphibious vehicles (e.g., hovercraft), aqueous vehicles (e.g., boats), submersible vehicles (e.g., submarines), vehicles located on or in proximity to another orbiting body, and/or the like.

Referring now to FIGS. 2A-E, some exemplary implementations of the flight management system 112 and the auto-flight system 118 of exemplary embodiments 200A, 200B, 200C, 200D, 200D, 200E are depicted.

Figure 2A:
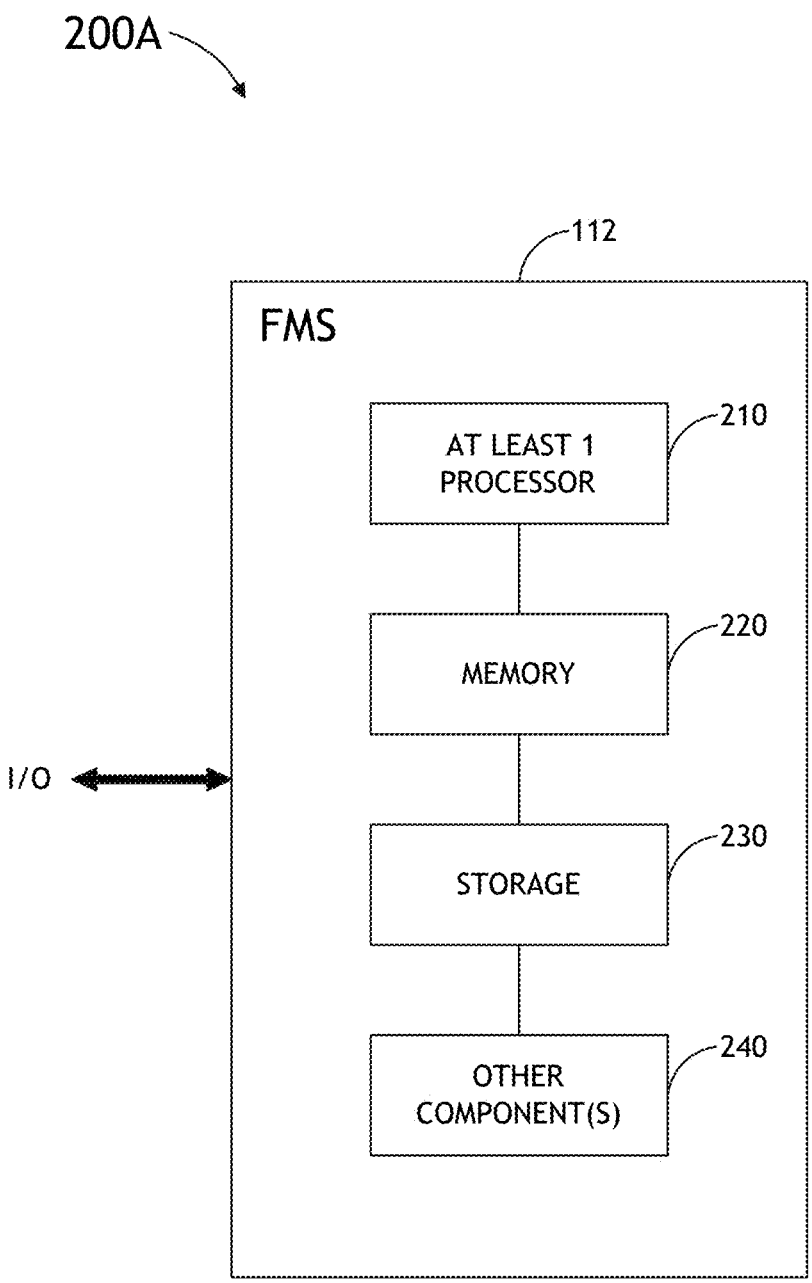
FIGS. 2A-B show an exemplary diagrams of a flight management system of some embodiments.
Figure 2B:
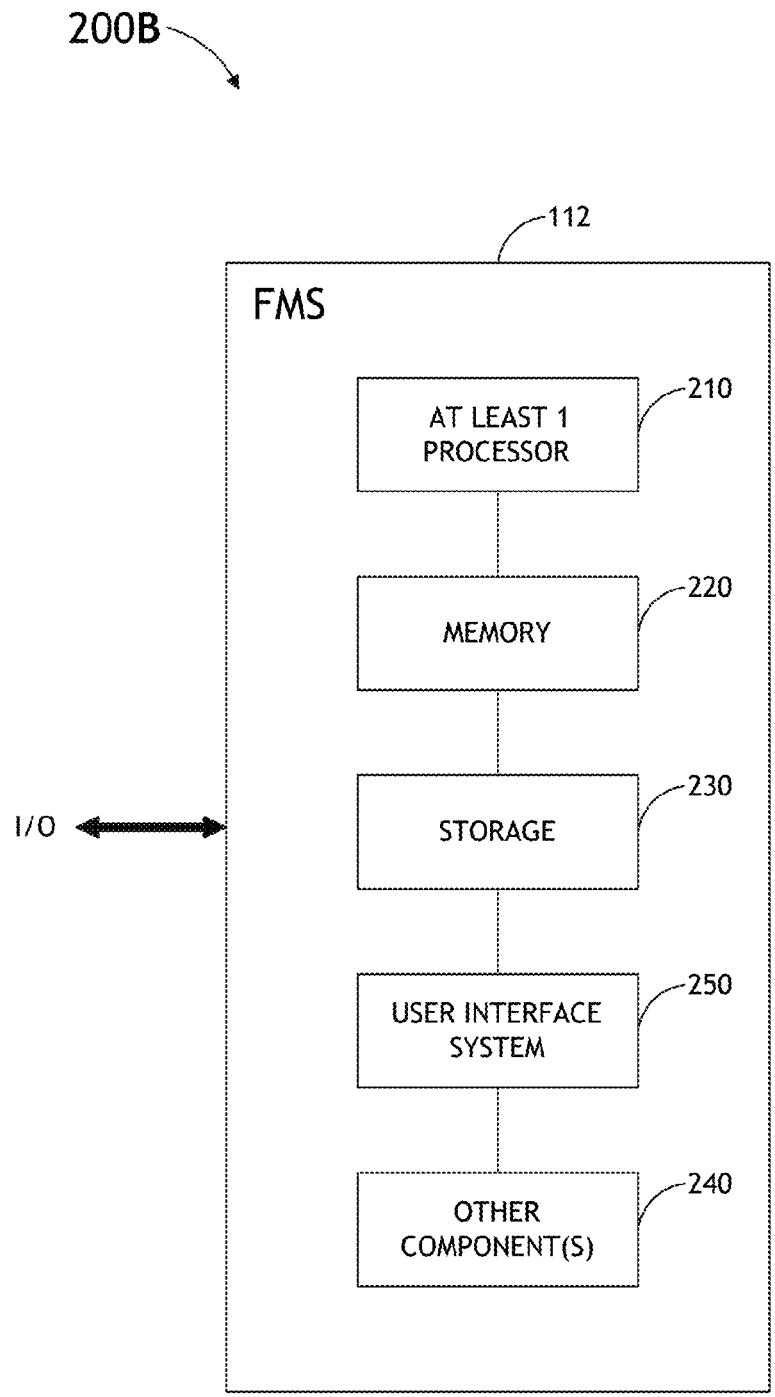

Referring now to FIGS. 2A-B, a flight management system (FMS) 112 of the aircraft 110 of exemplary embodiments 200A, 200B is depicted. In some embodiments, the flight managements system 112 and/or the auto-flight system 118 are configured to perform any number of operations, including, for example: performing climb and descent rate calculations, performing fuel optimization calculations, performing aircraft performance calculations, receiving data from onboard sources (e.g., the user interface system 113) or off-board sources (e.g., a communications station 130, such as an air traffic control communications station), performing modified flight path or plan calculations, performing calculations to predict flight path or flight plan, outputting data (such as graphical data) to onboard or off-board destinations, or the like.

The FMS 112 of exemplary embodiments 200A, 200B includes a plurality of communicatively coupled components. For example, in the exemplary embodiment 200A, the FMS 112 includes at least one processor 210, at least one memory 220, at least one storage device 230, as well as other components 240. For example, in the exemplary embodiment 200B, the FMS 112 includes at least one processor 210, at least one memory 220, at least one storage device 230 (such as a hard-disk drive or solid-state drive), a user interface system 250, as well as other components 240. In some embodiments, other components 240 include, but are not limited to, any of the following: a bus; a cache; a display; a battery; a power source; wired, cabled, or wireless networking components (such as a networking card or antenna); digital or analog signal input/output ports; a removable storage media drive; removable storage media; firmware, software, or middleware; and/or the like. As shown in FIGS. 2A-B, the FMS 112 is configured to send and receive signals (such as digital input/output (I/O) signals or analog signals) to and from particular systems of the aircraft 110 (e.g., as shown in FIG. 1).

In some embodiments, the user interface system 250 of the FMS 112 may include the at least one user interface system 113 of the aircraft 110, may be in addition to the at least one user interface system 113 of the aircraft 110, may be linked with one or more particular user interface systems of the at least one user interface system 113 of the aircraft 110, and/or may be separate from one or more user interface systems of the at least one user interface system 113 of the aircraft 110.

Figure 2C:
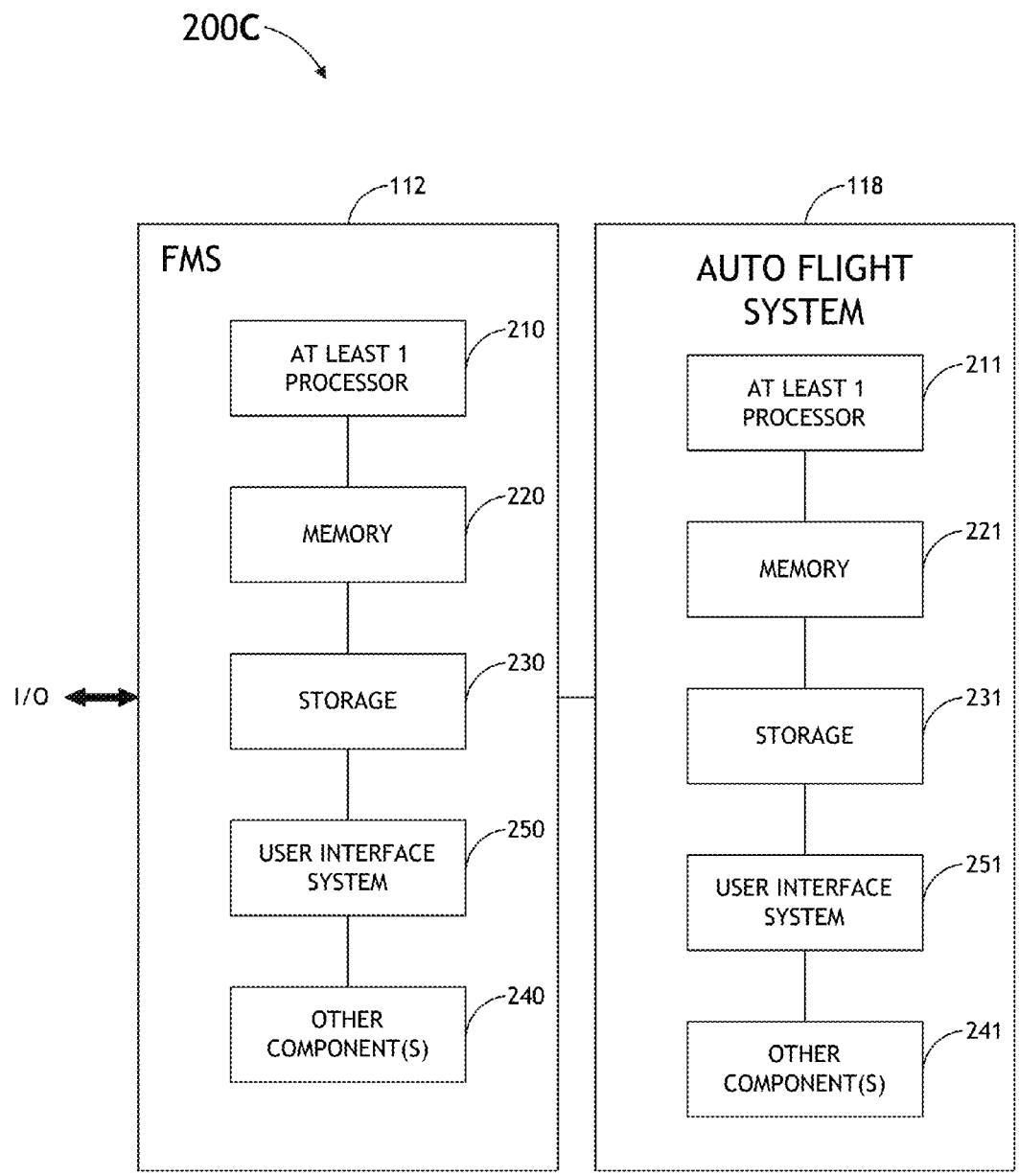
FIG. 2C shows an exemplary diagram of a flight management system and an auto-flight system of some embodiments.

Referring now to FIG. 2C, in some embodiments, the flight management system 112 is communicatively coupled to the auto-pilot or auto-flight system 118. For example, in the exemplary embodiment 200C, the auto-flight system 118 includes at least one processor 211, at least one memory 221, at least one storage device 231, at least one user interface system 251, as well as other components 241. In some embodiments, the other components 241 include, but are not limited to, any of the following: a bus; a cache; a display; a battery; a power source; wired, cabled, or wireless networking components (such as a networking card or antenna); digital or analog signal input/output ports; a removable storage media drive; removable storage media; firmware, software, or middleware; and/or the like. As shown in FIG. 2C, the FMS 112 and/or the auto-flight system 118 are configured to send and receive signals (such as digital input/output (I/O) signals or analog signals) to and from particular systems of the aircraft 110 (e.g., as shown in FIG. 1).

In some embodiments, the user interface system 251 of the auto-flight system 118 may include the at least one user interface system 113 of the aircraft 110, may be in addition to the at least one user interface system 113 of the aircraft 110, may be linked with one or more particular user interface systems of the at least one user interface system 113 of the aircraft 110, and/or may be separate from one or more user interface systems of the at least one user interface system 113 of the aircraft 110.

Figure 2D:
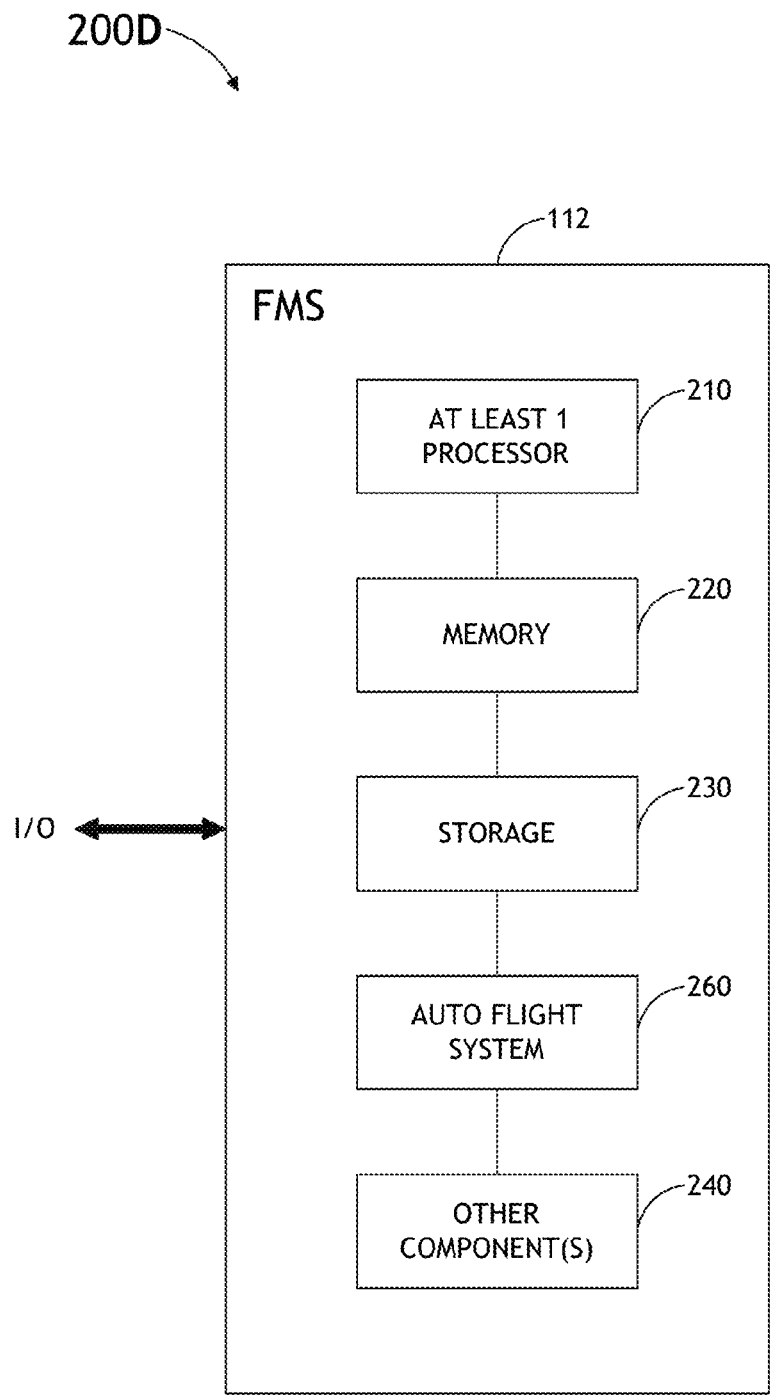
FIG. 2D shows a further exemplary diagram of a flight management system of some embodiments, wherein the flight management system includes an auto-flight system.
Figure 2E:
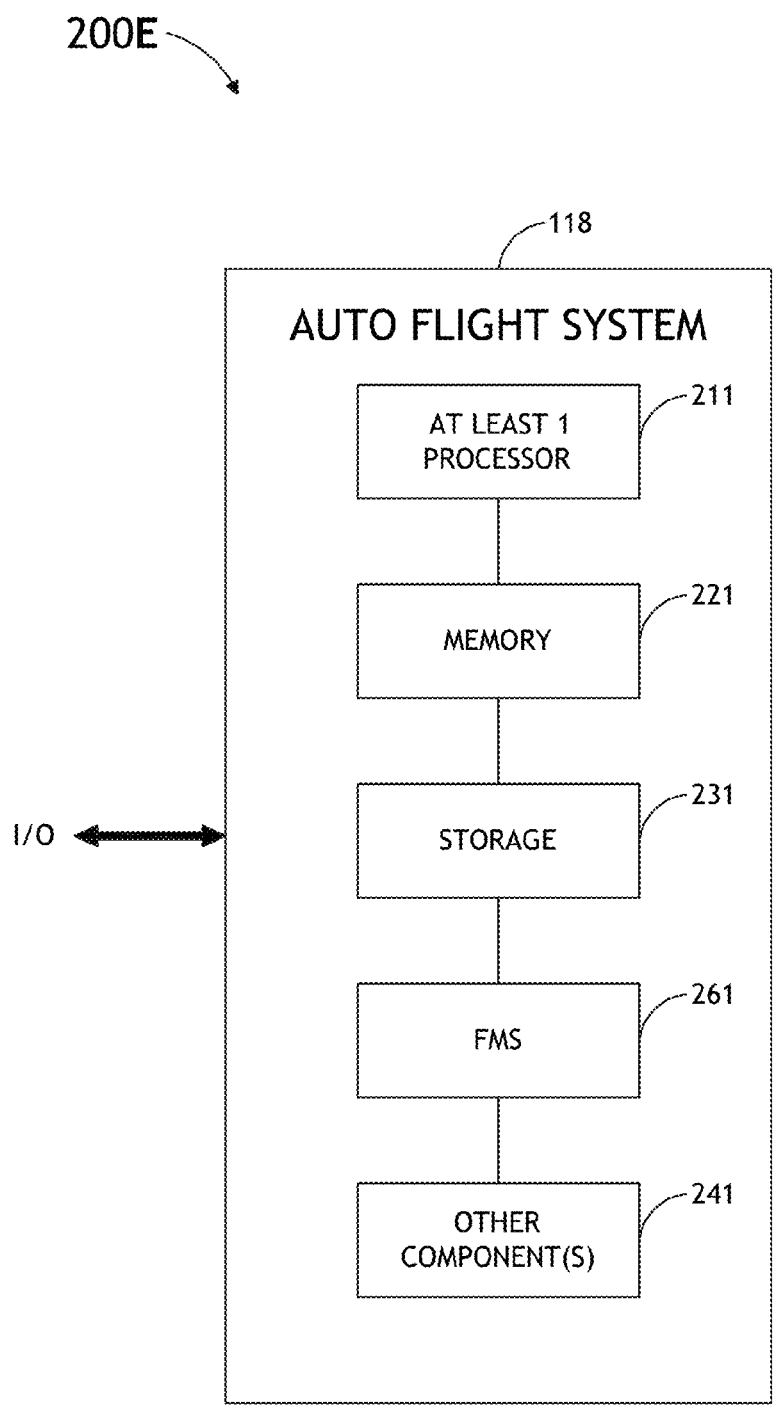
FIG. 2E shows a further exemplary diagram of an auto-flight system of some embodiments, wherein the auto-flight system includes a flight management system.

Referring now to FIG. 2D-E, in contemplated embodiments, the aircraft 110 includes a hybrid flight-management/auto-flight system having integrated functionality of the flight management system 112 and the auto-flight system 118 as described and depicted with respect to other embodiments (e.g., with reference to FIGS. 2A-C and as described throughout). Additionally, in particular embodiments the hybrid flight-management/auto-flight system includes at least one processor (e.g., 210 and/or 211), memory (e.g., 220 and/or 221), storage (e.g., 230 and/or 231), and other components (e.g., 240 and/or 241); furthermore, in some of the particular embodiments, the hybrid flight-management/auto-flight system further includes at least some dedicated flight management system components, at least some dedicated auto-flight system components, and some shared system components. Additionally, in some of the particular embodiments, the hybrid flight-management/auto-flight system includes a user interface system (e.g., 250 and/or 251) or is coupled to the user interface system 113 of the aircraft 110.

For example, referring to FIG. 2D, in an exemplary embodiment, the FMS 112 includes the at least one auto-flight system 260 of the aircraft 110. The auto-flight system 260 may be in addition to the at least one autopilot system or auto-flight system 118 of the aircraft 110, may be linked with one or more particular autopilot systems or auto-flight systems, and/or may be separate from one or more autopilot systems or auto-flight systems of the aircraft 110. In particular embodiments, the auto-flight system 260 of the FMS 112 may be implemented as instructions executed by a processor which are stored in a non-transitory computer readable medium; additionally, the auto-flight system 260 of the FMS 112 may include or may be implemented as one or some combination of software modules or computer hardware modules.

For example, referring to FIG. 2E, in an exemplary embodiment, the auto-flight system 118 includes the at least one FMS 261 of the aircraft 110. The FMS 261 may be in addition to the FMS 112 of the aircraft 110, may be linked with one or more particular FMSs, and/or may be separate from other FMSs 112 of the aircraft 110. In particular embodiments, the FMS 261 of the auto-flight system 118 may be implemented as instructions executed by a processor which are stored in a non-transitory computer readable medium; additionally, the FMS 261 of the auto-flight system 118 may include or may be implemented as one or some combination of software modules or computer hardware modules.

Referring now to FIGS. 3A-3C, the user interface system 113 of the aircraft 110 of exemplary embodiments 300A, 300B, 300C is depicted. In some embodiments, one or more of the at least one user interface system 113 of the aircraft 110 may include, may be separate from, or may be linked with a user interface system 250, 251 of the flight management system (FMS) 112 or the auto-flight system 118. In some embodiments, the at least one user interface system 113 of the aircraft 110 includes at least one processor, storage, a memory, or the like.

As shown in FIG. 3A, a particular user interface system 113 of the exemplary embodiment 300A includes at least one user input device 310 or is configured to receive a digital and/or analog signal from at least one user input device 310. The user input device 310 can include a sensor (such as an optical sensor (such as a camera, a motion tracking sensor, or an eye tracking sensor), an electroencephalograph (EEG) sensor, or the like), a pointer device (such as a mouse, touch pad, trackball, or the like), a microphone, one or more buttons, a gyroscope, a joystick, or the like. The particular user interface system 113 of the exemplary embodiment 300A also includes at least one user output device 320 or is configured to output or transmit a digital or analog signal to at least one user output device 320. The user output device 320 can include a display, a projector (such as an image projector, a retina projector, or the like), one or more liquid crystal cells, one or more light emitting diodes (LEDs), a speaker, a bell, a gauge, a vibration-producing unit, or the like. The particular user interface system 113 of the exemplary embodiment 300A also includes at least one user input/output device 330 or is configured to output or transmit digital and/or analog signals to and receive digital and/or analog signals from at least one user input/output device 330.

Referring now to FIG. 3B, in some embodiments the user input/output device 330 comprises a touchscreen display 331, a touchscreen flight control panel 450, or the like.

Referring now to FIG. 3C, in some embodiments, a particular user interface system 113 of an exemplary embodiment 300C includes at least one touchscreen display system 331, a touchscreen control panel 450, an eye tracking system 311, and a voice recognition system 312. In some embodiments, the eye tracking system 311 is configured to track eye gestures, movement of a user's eye, a user's gaze, or the like. In some embodiments, the voice recognition system 312 is configured to recognize voice commands of a user.

Additionally, in some embodiments, portions of the user interface system 113 are implemented through the execution of software or firmware by a processor to present and/or output user interface (UI) data (which, when presented to the user, is perceivable by the user 111 through sensations or physiological responses (e.g., through visual sensations, audible sensations, tactile sensations, pressure sensations, olfactory sensations, response to released or introduced chemicals (e.g., neurotransmitters or pharmaceutical agents), response to neural stimulation, response to electrical stimulation, response to rapidly changing focused electromagnetic fields (e.g., alternating electromagnetic pulses), and/or the like). For example, in some embodiments the user interface information is presented to the user 111 as a graphical user interface (GUI) on a display or a touchscreen display 331, one or more touchscreen displays (e.g., 451a, 451b, 451c; see FIGS. 4B-J) of the touchscreen flight control panel 450, or the like.

Some embodiments of the invention include the at least one user interface system 113 being configured to present information to the user 111 from the flight management system (FMS) 112, the auto-flight system 118, a hybrid FMS-autoflight system, or the like and being configured to send information received from the user 111 to the FMS 112, the auto-flight system 118, the hybrid FMS-auto-flight system, or the like.

In some embodiments, the user interface system 113 comprises one or more of the following: a voice recognition system 311 (which may include one or more microphones, one or more speakers, or the like), an eye tracking system 312 (which may include a sensor, such as camera or the like), electroencephalograph (EEG) system, a touch-based technology system (e.g., a touch-screen display 331), or the like. In some embodiments, the touch-based technology system may include a tactile feedback system, a haptic technology-based system, a cutaneous technology-based system, touch-conductivity technology-based system, a multi-touch surface, a pressure-triggered screen, a stylus, a joystick, a keyboard, a key panel, a knob (such as a push-button rotatable knob), a switch, a button, a scroll wheel, a hybrid button (such as a push-button scroll wheel, a push-button knob, or the like), a pedal, a cursor control panel, a mouse, and/or the like.

Referring now to FIG. 4A, a partial view of a cockpit of the aircraft 110 of an exemplary embodiment 400 of the invention is depicted. In some embodiments, a user 111 (e.g., a pilot, a copilot, a navigator, or the like) can interface with various components of the cockpit. In some embodiments, the cockpit includes at least one user interface system 113, flight controls 114, as well other instrumentation and components of a cockpit. For example, a particular user interface system 113 may include one or a plurality of displays (such as one or more touch-screen displays 331, a head-up display 420, or the like); a touchscreen flight mode control panel 450; a voice recognition system 312 (which can include at least one microphone 411 and at least one speaker 412); an eye tracking system 311 (which can include one or a plurality of optical sensors (e.g., a plurality of cameras 430)); a keyboard 410 of a user input device 310; or the like.

Figure 4B:
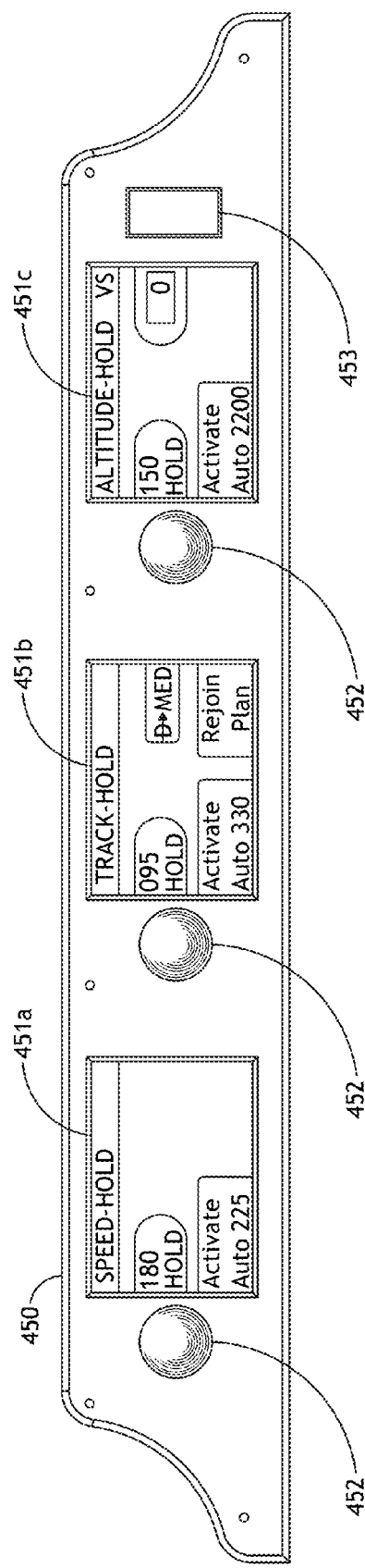
FIG. 4B shows a front view of an exemplary touchscreen flight control panel 450.
Figure 4C:
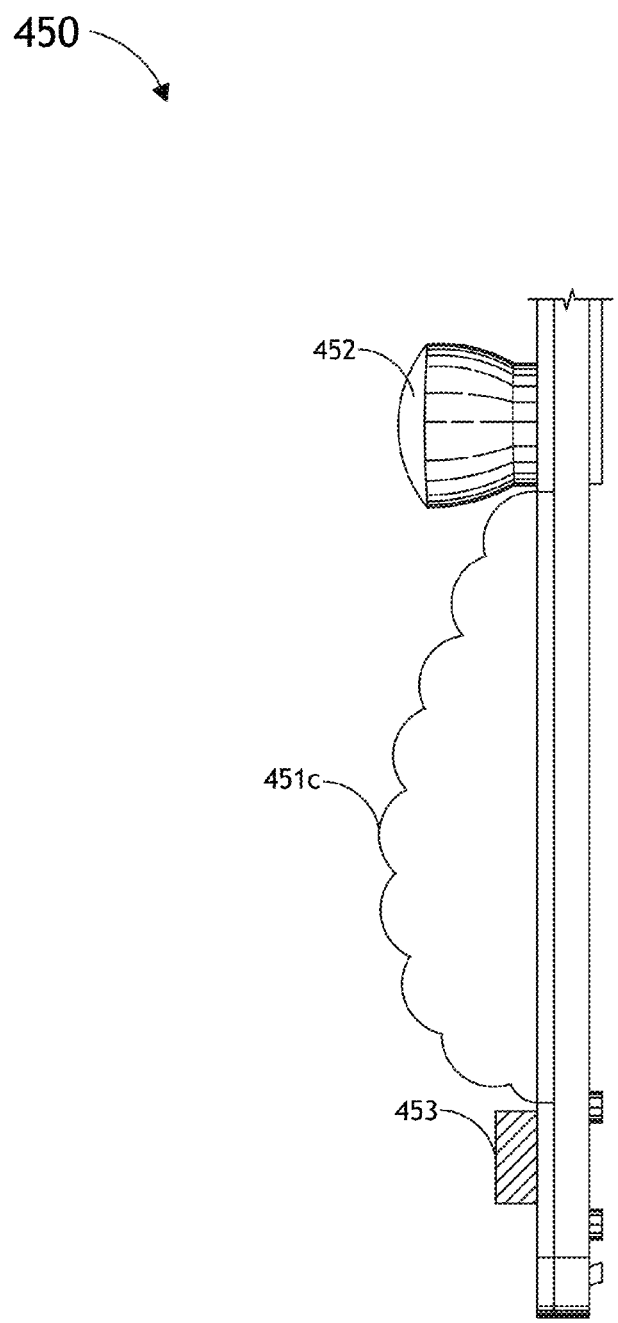
FIG. 4C shows a partial overhead view of an exemplary touchscreen flight control panel 450.

Referring now to FIGS. 4B-C, exemplary views of a touchscreen flight mode control panel 450 of some embodiments are depicted. Embodiments of the invention allow for the reduction in the number of necessary flight modes by pairing the touchscreen flight mode control panel 450 with automation of the flight management system 112 and/or the auto-flight system 118. That is, embodiments of the invention allow for the pilot to control flight systems through only a few primary flight modes (such as three primary flight modes: 1) a speed mode (e.g., an airspeed mode), 2) a lateral mode (e.g., a heading or track mode), and 3) a vertical mode) rather than operating more than thirty flight modes as required by currently implemented flight systems. In some embodiments, each of the primary flight modes includes two or more sub-modes (such as an "automatic" sub-mode, a "hold" sub-mode, or the like), which may be set by the user to a particular sub-mode of the one or more sub-modes. This reduction of flight modes aligns with pilot goals and simplifies a pilot's operation of the aircraft.

In some embodiments, the touchscreen flight mode control panel 450 is configured to display one or more primary flight modes to the user 111 (e.g., a pilot) and to allow the user 111 to control each (or a particular) of the primary flight modes. In some embodiments, the touch screen flight mode control panel 450 includes: one or more touchscreen displays (e.g., 451a, 451b, 451c) each being associated with a particular primary flight mode at a given time; one or more buttons (such as push-button knobs 452), wherein each of the one or more buttons is associated with (e.g., configured to control or to receive direct-execution user inputs associated with) a particular touchscreen display (e.g., 451a, 451b, 451c) of the touchscreen flight mode control panel 450; and/or at least one other user input component, such as a scroll wheel 453 (as shown in FIGS. 4B-C). In particular exemplary embodiments, each of the one or more buttons comprise a push-button knob 452 configured to be depressed, rotated, and/or pivoted about an attachment point such that the touchscreen flight mode control panel 450 can detect an occurrence, a duration, a direction, a particular type, and/or a magnitude of user manipulation with the respect to the particular push-button knob 452. The push-button knobs 452 are configured to take immediate action (e.g., configured to directly execute an action) when the pilot interacts with the push-button knob 452 (e.g., pressing or turning the push-button knob 452). Embodied touchscreen flight mode control panels 450 eliminate legacy armed autopilot modes in favor of direct execution. For example, the pilot may perform a direct action (e.g., push, turn, or the like) on the push-button knob 452 to execute a flight mode change. Exemplary knob push functions include matching an air speed, activating or deactivating automation of an airspeed based upon Mach speed factors, synchronizing a lateral heading or track, or the like. The simplified primary flight modes allow (and may be configured to always allow) for direct and immediate execution of automated or manual modes, whereas currently implemented systems often take no action (and provide no feedback that no action has been taken) because of complex logic strings associated with the high number of flight modes in current systems. Exemplary depictions associated with primary flight modes of the current invention are shown in more detail in FIGS. 4D-J, which are described in more detail, below.

In some embodiments, the primary flight modes include a speed mode (e.g., an airspeed mode), a lateral mode, and a vertical mode; while three exemplary primary flight modes are described, a different number (such as one, two, four, five, six, or more) of primary flight modes or different types of primary flight modes are fully contemplated. Likewise, while particular embodiments of the invention describe the touchscreen flight mode control panel 450 as having three touchscreen displays 451a, 451b, 451c, it is fully contemplated that embodied touchscreen flight mode control panels 450 may include any number of touchscreen displays (such as one, two, four, five, six, or more). Additionally, in some embodiments, the touchscreen flight mode control panel 450 includes touchscreen displays of the same or different sizes, in a vertical or horizontal arrangement, or the like. Furthermore, it is fully contemplated that the one or more buttons (e.g., 452) of the touchscreen flight mode control panel 450 may include buttons having the same or distinctive features, such as size, shape, texture, color, relative placement location, height, length, stiffness, or the like.

As shown in FIGS. 4D-J, each of the primary flight modes is associated with a particular touchscreen display 451a, 451b, 451c of the touchscreen flight mode control panel 450. As is exemplarily depicted in FIGS. 4D-J, the touchscreen display 451a presents a touch-GUI ("touch graphical user interface") associated with the airspeed mode to the user 111 (e.g., the pilot) (see FIGS. 4B, 4D, 4G); the touchscreen display 451b presents a touch-GUI associated with the lateral mode to the user 111 (see FIGS. 4B, 4E, 4H, 4K); and the touchscreen display 451c presents a touch-GUI associated with the vertical mode to the user 111 (see FIGS. 4B, 4F, 4I, 4J). In some embodiments, the particular touchscreen display 451a, 451b, 451c of the touchscreen flight mode control panel 450 is configured to present information associated with each particular primary flight mode to the user and configured to receive or detect user input (e.g., user input data) associated with information of the particular primary flight mode. For example, in some embodiments, each touchscreen display 451a, 451b, 451c of the touchscreen flight mode control panel 450 is configured to present information associated with two or more sub-modes (such as a current mode indication (e.g., "speed-hold", "track-hold", "altitude-hold", "airspeed-auto", "track-auto", "altitude-auto", or the like), a sub-mode activation button (e.g., an "activate auto" button, a "speed" button, an "altitude" button or the like), or other information of the particular primary flight mode. (See, e.g., 451a, 451b, 451c as shown in FIGS. 4B, 4D-K, which are described in more detail, below.)

Referring now to FIGS. 4B, 4D, and 4G, the primary speed mode touchscreen display 451a allows the user to perform rapid and direct executions to activate or deactivate modes associated with the primary speed flight mode. For example, if the primary speed mode is currently set in an "airspeed-auto" sub-mode (as shown by the current mode indication in FIG. 4G), the pilot may quickly execute a primary airspeed "hold" sub-mode (e.g., by pressing "speed 250", as depicted in FIG. 4G), which executes instructions to maintain the current airspeed. Additionally, if the primary speed mode is currently set in an "speed-hold" sub-mode (as shown by the current mode indication in FIG. 4D), the pilot may quickly set the airspeed sub-mode to an "automatic" sub-mode (e.g., by pressing "activate auto 260", as depicted in FIG. 4D), which executes instructions for automation to control the airspeed. While some embodiments of the invention are described as being implemented with reference to a primary airspeed flight mode, it is fully contemplated that some embodiments of the invention may be configured or implemented without a restriction as to the presence or lack of a particular navigable medium (such as the presence or absence of an atmospheric medium or the like).

Referring now to FIGS. 4B, 4E, and 4H, the primary lateral mode touchscreen display 451b allows the user to perform rapid and direct executions to activate or deactivate modes associated with the primary lateral mode. Additionally, as shown in FIG. 4E, if the primary lateral mode is currently set in a "hold" sub-mode (e.g., as shown by the current mode indication of "track-hold" in FIG. 4E), the pilot may quickly activate an automatic sub-mode (e.g., "activate auto 260" of FIG. 2E), which executes instructions for automation to control the lateral direction. Also, as shown in FIG. 4E, the pilot may quickly execute a direct to course mode (e.g., direct to a waypoint identifier, such as "DIRECT TO CID"), a rejoin flight plan mode, an optimal course mode, or the like (see also FIG. 10, which is described in more detail, below). Furthermore, in some embodiments, as shown in FIG. 4H, if the primary lateral mode is currently set in an "auto" sub-mode (e.g., as shown by the current mode indication of "track-auto" in FIG. 4H), the pilot may quickly execute a particular "hold" sub-mode ("heading 340" of FIG. 4H). Additionally, in some embodiments, as shown in FIG. 4H, the pilot may quickly initiate another particular sub-mode sequence which prompts the pilot for more information as to lateral direction based upon a further selection or input information from the pilot, another user 121, 131, 141, or another system. Additionally, in some embodiments, when the pilot activates a mode, which is ambiguous (such as the another particular sub-mode sequence (e.g., as shown in FIG. 4H)), the system will prompt the pilot for options to define the ambiguous mode. For example, the system may prompt the pilot for information as to whether the aircraft is cleared for approach.

Figure 4J:
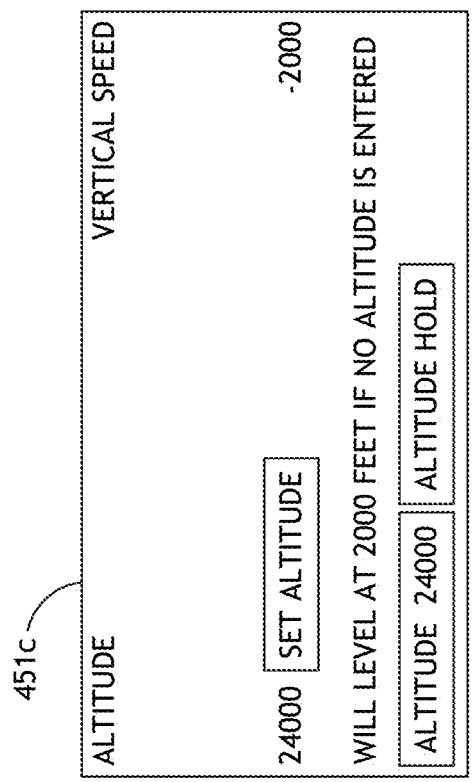
Figure 4K:
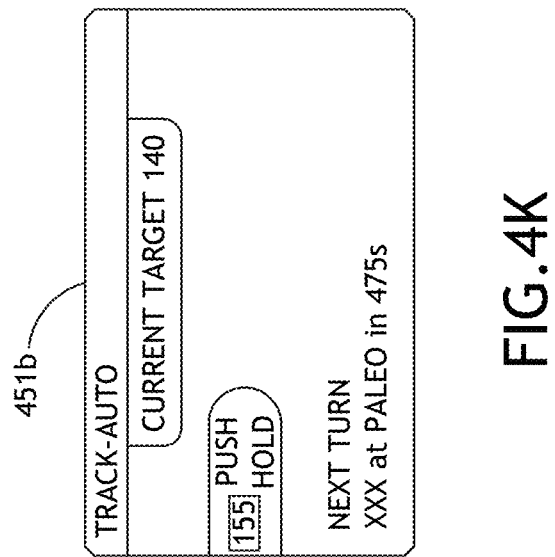

Referring now to FIG. 4K, a further exemplary screenshot of an exemplary primary lateral mode touchscreen display 451b is shown. As depicted, the primary lateral mode touchscreen display 451b is also configured to present other information, which may be contextually relevant to the pilot. For example, in exemplary embodiments, when the primary lateral mode is currently set in an "auto" sub-mode (e.g., as shown by the current mode indication of "track-auto" as shown in FIG. 4K), the primary lateral mode touchscreen display presents to the pilot contextually relevant flight management system data. In particular embodiments, the primary lateral mode touchscreen display 451b is configured to present a generic turn at specific tracking number at specific point in time, such as illustrated in FIG. 4K.

Referring now to FIGS. 4F, 4I, and 4J, the primary vertical mode touchscreen display 451c allows the user to perform rapid and direct executions to activate or deactivate modes associated with the primary vertical mode. Currently, aircraft regulations require that the pilot sets the altitude for safety reasons. As such, some embodiments of the invention provide solutions for providing a simplified and engaging automation system to pilots, whereby a goal (e.g., a quantitatively and/or dynamically measured goal through the performance of operations based upon situation specific factors and pilot specific factors) of the system is to promote a pilot's use of the automation rather than a pilot's exiting of the auto-flight system in favor of a manual flight mode; that is, some embodiments of the invention promote the goal of a pilot's use of automation and suggestions rather than having a pilot completely bypass and exit the auto-flight system altogether.

For example, in some embodiments, as shown in FIG. 4F, if the primary vertical mode is currently set in a "hold" sub-mode (e.g., as shown by the current mode indication of "altitude-hold" in FIG. 4F). As such, the pilot may quickly activate an automatic sub-mode (e.g., "activate auto" of FIG. 4F) of the primary vertical mode. For example, in some embodiments, activation of the automatic sub-mode suggests an altitude (e.g., an optimized altitude, or the like) to the pilot; in further embodiments, the activation of the automatic sub-mode of the primary vertical flight mode increases or decreases a vertical speed/climb rate (e.g., an aggressiveness).

Additionally, as shown in FIG. 4I, if the primary vertical mode is currently set in an automatic sub-mode (e.g., as shown by the current mode indication of "altitude-auto" in FIG. 4I) the pilot may quickly execute a particular "altitude hold" mode to execute instructions to maintain the current altitude. Additionally, in some embodiments, the system is configured to suggest an altitude which may be selected by the pilot; for example, the pilot may execute a suggested alternative altitude mode (e.g., "altitude 24000") as an alternative to an altitude profile of the current primary vertical sub-mode, which executes instructions to decrease altitude to 24000 from 28000.

Furthermore, referring to FIG. 4J, the pilot may quickly execute a vertical speed (or acceleration) rate mode, which executes instructions to increase or decrease the vertical speed (or acceleration); as such, if the pilot does not input a maximum or minimum altitude, the system will automatically set a maximum or minimum altitude based upon factors (such as safety, aircraft limitations, performance, or the like).

While FIGS. 4D-K each depict a single exemplary screenshot of a particular primary flight mode touchscreen display (e.g., 451a, 451b, 451c), it is fully contemplated that, in some embodiments, the flight mode control panel 450 may include any combination of one or more particular primary flight mode touchscreen displays (such as two or more particular primary flight mode touchscreen displays (e.g., at least two of 451a, 451b, 451c) and/or configured to present any combination of graphical output portion(s) associated with one or more particular primary flight modes (e.g. two or more primary flight modes).

In some embodiments, the particular mode options presented to the pilot on a particular primary flight mode touchscreen display (e.g., 451a, 451b, 451c) are contextually driven so that only mode options which are applicable or relevant to particular flight conditions are presented to the pilot. The contextually driven nature of the presented mode options simplifies the pilot's job by requiring that the pilot only manage a few primary modes and contextually sensitive sub-modes, which depend on particular flight conditions. Additionally, prior to a user executing a particular function, contextually relevant flight mode options may present a preview to the pilot as to the result of the execution of a particular flight sub-mode; for example, a pilot selecting the "automatic 260" (as shown in FIG. 4D) would result in the speed of the aircraft increasing from the current speed of "250" to "260" (within a predetermined amount of time upon execution of the "automatic" function).

Embodiments, which include the touchscreen flight mode control panel 450, facilitate rapid entry and salient feedback to the user 111 (e.g., the pilot), while providing the user 111 additional automation and situational awareness. Furthermore, in some embodiments, the touchscreen interface of the touchscreen flight mode control panel 450 facilitates the presentation of relevant information by filtering out some or all of the non-contextually sensitive content (such as sub-modes which are irrelevant to particular flight conditions) so as to promote the presentation of contextually sensitive and/or driven content (e.g., relevant information) to the pilot at a given time. The touchscreen interface of embodied touchscreen flight mode control panels 450 provide an improvement over traditional button-based flight control panels, which are composed of mode selector buttons and data control knobs, because the traditional button-based flight control panels provide little user feedback, are complex to operate, and fail to provide dynamically determined relevant content to a pilot. As such, embodiments which include a touchscreen flight mode control panel 450 reduce pilot confusion and simplify pilot tasks related to managing, activating, and deactivating flight modes.

In further embodiments, navigation tasks are organized or decomposed into tactical navigation functions and strategic navigation functions. For example, tactical navigation functions include functions to modify flight plans; whereas strategic navigation functions include functions associated with rendering a flight map to be presented to a user 111, 121, 131, 141 (e.g., output of strategic navigation functions performed by a flight map application for presentation to a pilot) without modifying the flight plan. For example, tactical navigation functions may be associated with activating or deactivating a particular flight mode, rejoining a flight plan, or modifying a flight plan. On the other hand, strategic navigation functions may be associated with: rendering various topological features (see, e.g., 623), weather conditions, obstacles (see, e.g., 622), or the like; zooming; panning; rotating; or the like without modifying the flight plan or current flight modes. In some embodiments, output from tactical navigation functions is presented to the user 111, 121, 131, 141 on one or more of the touchscreen displays 451a, 451b, 451c of the touchscreen flight mode control panel 450 (see FIGS. 4B-J); and the output of the strategic navigation functions are output by a flight map application and presented to the user 111, 121, 131, 141 on a separate touchscreen display (such as one or more of touchscreen display system 331 of FIG. 4A); however, in some embodiments, outputs of both tactical navigation functions and strategic navigation functions are be presented on the same display or on some of the same displays of a plurality of displays; that is, for example, in some embodiments both tactical navigation functions and strategic navigation functions are presented on the touchscreen display 331, and only tactical navigation functions are presented on the touchscreen display 451a, 451b, 451c of the touchscreen flight mode control panel 450.

In some embodiments, for example, concurrent performance of tactical navigation functions and strategic navigation functions allows a modified flight plan (e.g., by performing tactical navigation functions) to be displayed cohesively with respect to a rendered flight map (e.g., by performing strategic navigation functions), wherein output of particular tactical navigation functions and/or particular strategic navigation functions may be contextually filtered so that only the output of contextually sensitive (e.g., relevant) tactical or strategic functions is presented to the user 111, 121, 131, 141. Additionally, the organization of navigation functions into tactical navigation functions and strategic navigation functions allows the user 111, 121, 131, or 141 to easily execute particular tactical or strategic navigation tasks (e.g., such as commonly used tasks) through a direct-execute single button press or single performance of a sequence of one or more gestures (e.g., touch gestures). In particular embodiments, tactical navigation functions are performed by software applications, software modules, processes, services, or hardware components separate from strategic navigation functions; however, it is fully contemplated that, in some embodiments, tactical navigation functions and strategic navigation functions may be performed by at least partially shared, linked, or coupled software applications, software modules, processes, services, or hardware components. Additionally, for example, output of a particular tactical navigation function including functions to modify flight plans may be presented to the pilot on a touchscreen flight mode control panel 450 only when the particular tactical navigation function is relevant. In some embodiments, software or hardware of an aircraft (such as software or hardware components of a flight control panel, the user interface system 113, the FMS 112, or some combination thereof) may control tactical flight plan changes (e.g., direct-to flight plan changes or rejoin-flight-plan changes) and may harmonize the tactical flight plan changes with the flight map application. In some embodiments, the user interface system 112 (e.g., touchscreen display systems 331) is context driven so that only outputs of functions or modes, which have some threshold (e.g., a predetermined threshold) amount of applicability or relevance to a particular flight condition or situation, are presented to a user (e.g., a pilot) at a particular time.

In some embodiments, the automation, which controls various automatic flight modes (among other functions), determines the contextual relevance of various flight modes (among other functions), suggests particular flight paths or plans, or the like, is implemented by an auto-flight system 118. In particular embodiments, the auto-flight system 118 is included in or coupled to the touchscreen flight mode control panel 450 and/or the flight management system 112. Additionally, in some embodiments the auto-flight system 118 comprises a pilot-goal-based auto-flight system. In exemplary embodiments, the automation (e.g., of the auto-flight system 118) is configured to determine, select, or suggest an efficient flight profile (e.g., the most efficient flight profile, a substantially efficient flight profile, or a more efficient profile, or the like), an improved or optimized flight profile, or the like based upon one more goals or factors. In exemplary embodiments, the automation is configured to determine and select an efficient flight profile based upon a set of goals; for example, the set of goals may comprise pilot manual set goals, pilot inferred goals, safety goals, or the like.

For example, the pilot manual set goals may be based upon goals or factors which include any or all of the following: a particular time at an altitude and a waypoint; an altitude at a waypoint; an altitude; a minimum or maximum climb rate; a cost index; an aggressiveness (e.g., with respect to a vertical acceleration); an airspeed; or the like.

The pilot inferred goals may be based upon goals or factors which include any or all of the following: aircraft performance (which may include aircraft limitations, predictive and actual winds, temperature, weight, or the like); procedures (e.g., procedures specific to company/organization profiles, noise abatement procedures, air traffic control restrictions, arrivals (which may be sorted and filtered by direction of travel and ATC procedures), approach (which may be sorted and filtered by weather minimums and winds), arrival times, or the like); obstacles; flight plan; flight phase; weather avoidance (e.g., so as to determine and suggest a flight path around or through significant weather events); traffic avoidance; passenger comfort (e.g., based upon climb rates, turbulence, rate of change of cabin pressure, or the like); or the like. In exemplary embodiments, the automation automatically calculates a path to avoid such constraints.

The safety goals may be based upon goals or factors which include any or all of the following: close proximity to terrain (e.g., a predetermined or variably determined threshold proximity to terrain); close proximity to significant weather (e.g., a predetermined or variably determined threshold proximity to spatial regions having weather conditions (e.g., winds, turbulence, or the like) which exceed one or more predetermined weather threshold values (e.g., a maximum wind speed safety value, or the like)); violation of any procedure-specific safety rules (e.g., a determining whether a particular flight procedure violates any safety rules specific to the particular flight procedure, such as determining whether performance of an approach procedure would violate any minimum visibility based upon current visibility conditions). In some embodiments, violation of any of the safety goals or safety constraints will trigger an alert notification to a user 111, 121, 131, 141 (such as the pilot, an air traffic controller, or the like), an on-board system, or an off-board system.

While some embodiments of the invention include organizing the goals into pilot manual set goals, pilot inferred goals, and safety goals, it is fully contemplated that embodiments of the invention may include other goal sets or any organizational structuring of goals, such as loose associations, overlapped groupings, non-organized structures of goals and/or constraints of goals, or the like.

For example, in a particular exemplary embodiment, the automation of the auto-flight system 118 is configured to pick an efficient flight profile based upon aircraft performance goals (of the pilot inferred goal set). In some embodiments, the flight management system 118 provides decision support assistance to the auto-flight system 118, whereby the flight management system 112 continuously or dynamically determines an efficient path (e.g., the most efficient path) based upon: weather (e.g., winds, temperatures, turbulence, convective weather conditions, hazards, or the like); air traffic flows; and aircraft limitations. In such embodiments, the flight management system 112 determines an optimized flight profile (which may include an optimized climb profile, lateral flight path changes, vertical flight path changes, or the like), and the flight management system 112 outputs or provides the optimized flight profile to the auto-flight system 118. Additionally, in exemplary embodiments, low level path and performance optimizations are automatically integrated into the flight plan so as to achieve efficient (e.g., substantially most efficient or most efficient) flight based pilot goals. Furthermore, in some embodiments, automation (e.g., automation of the flight management system 112, auto-flight system 118, the touchscreen flight mode control panel 450, an off-board system, and/or the like) is configured to suggest or propose a particular flight path or a particular flight change to provide improved performance (such as by suggesting flight level changes to take advantage of better winds, suggesting optimized step climbs, or the like); however, some suggested or proposed changes will require pilot confirmation or acceptance, in which case the pilot will be prompted to approve or deny such a suggested flight change.

Figure 5A:
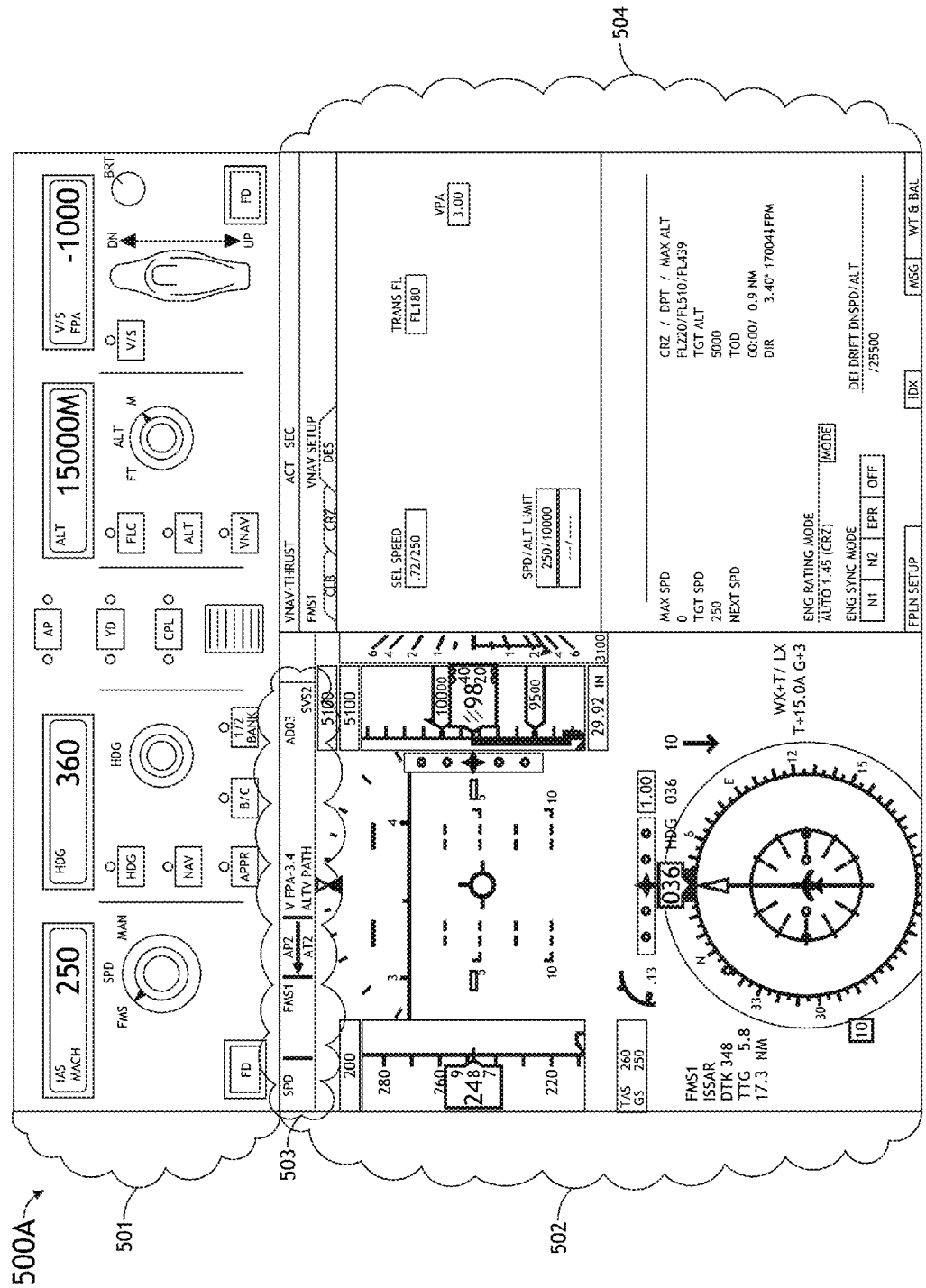

Referring generally now to FIGS. 5A-5B, a typical flight control panel 500A and flight mode table 500B of flight management system pages are shown. Current systems are largely controlled by buttons of a mode control panel 501 and functions accessed from the flight management system pages. A typical flight control system 500A includes a mode control panel 501; a primary flight display 502, which typically includes a flight mode annunciator 503; and a flight management system 504. As shown in FIGS. 5A-B, the annunciation of the 38 depicted flight modes is shown on the top of the primary flight display 502. Currently, pilots are expected to know all of the modes as well as how the modes transition. The complexities associated with operating the typical flight control panel 500A and knowing large numbers of flight modes currently leads to pilot confusion and other accidents. Embodiments of the invention, as described throughout, provide solutions to many of the problems depicted with respect to FIGS. 5A-B.

Figure 5C:
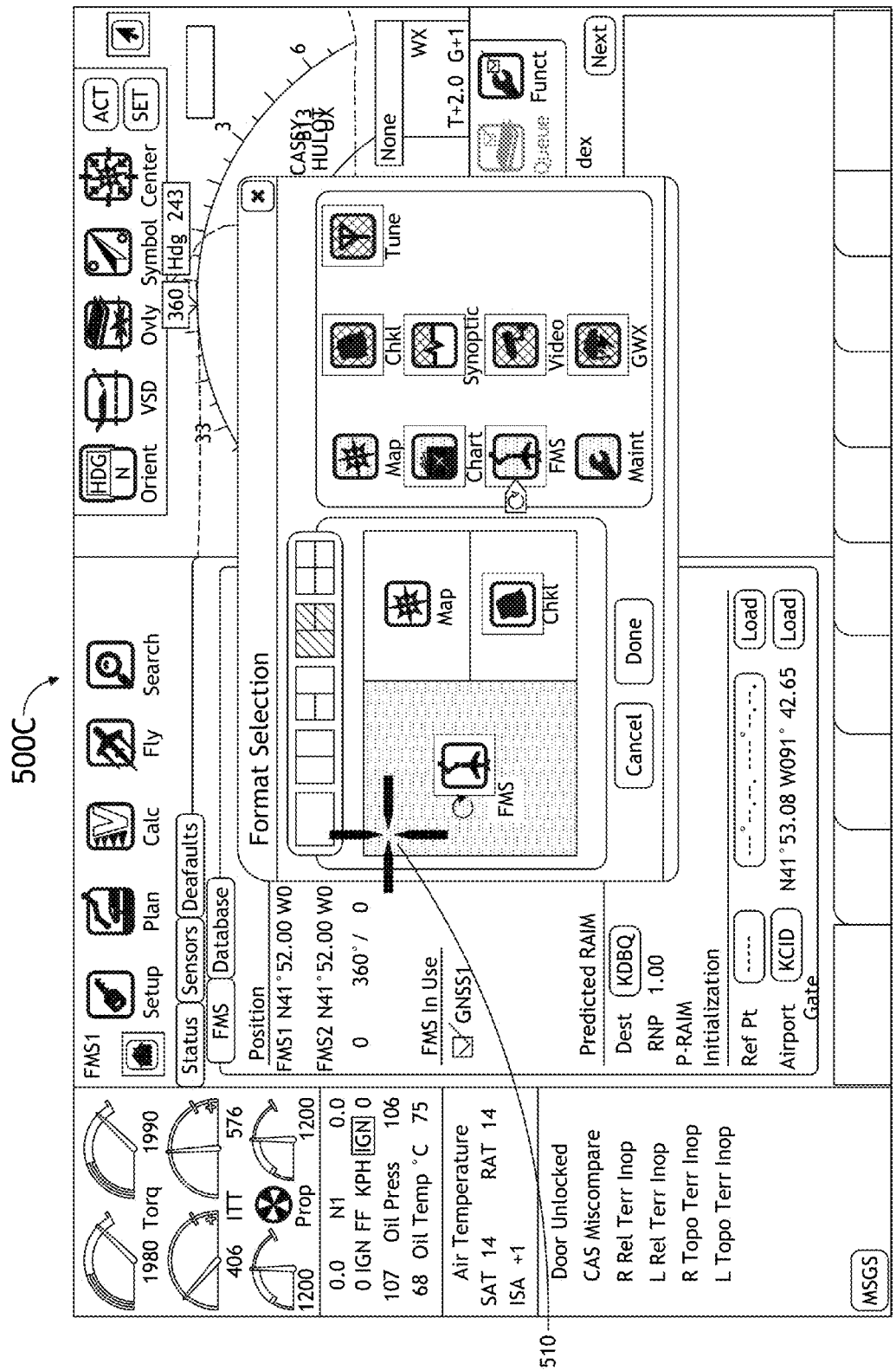
FIG. 5C shows an exemplary screenshot of a touch graphical user interface of some embodiments.

Referring now to FIG. 5C, an exemplary screenshot 500 of a touch-GUI of a particular touchscreen display system 331 of an exemplary embodiment is depicted. The screenshot 500 of the particular touch-GUI of the touchscreen display may present a multitude of user-selectable, user-manipulatable, or user-interactive data or information. For example, in some embodiments, the user 111 may press the touchscreen display system 331 at or in proximity to a point or area 510 of the touch screen display system 331. In some embodiments, the point or area 510 comprises an icon, a predefined region, a tile, a displayed region, or the like. For example, detecting a user interaction at or in proximity to the point or area 510 may select a flight management system user-interface screen to interactively present to the user 111. Additionally, in some embodiments the user 111 may perform a gesture (such as a touch-screen gesture) on or in proximity to the to the touch-screen display system. For example, in some embodiments the touch-screen display system 331 is configured to detect (at, on, or in proximity to a point or region of a surface of the touch-screen display system) single finger presses, multi-finger presses, single finger swipes, multi-finger swipes, multi-hand swipes, some combination thereof, or the like. Additionally, in some embodiments, the user 111 may select an icon, a predefined region, a tile, a displayed region, or the like through another device or subsystem (e.g., an eye tracking system 311 or voice recognition system 312) of the user interface system 113. In further embodiments, the user 111 may select an icon, a predefined region, a tile, a displayed region, or the like by using a combination of the touch-screen display system 331 and another device or subsystem (e.g., an eye tracking system 311 or voice recognition system 312) of the user interface system 113.

Figure 8:
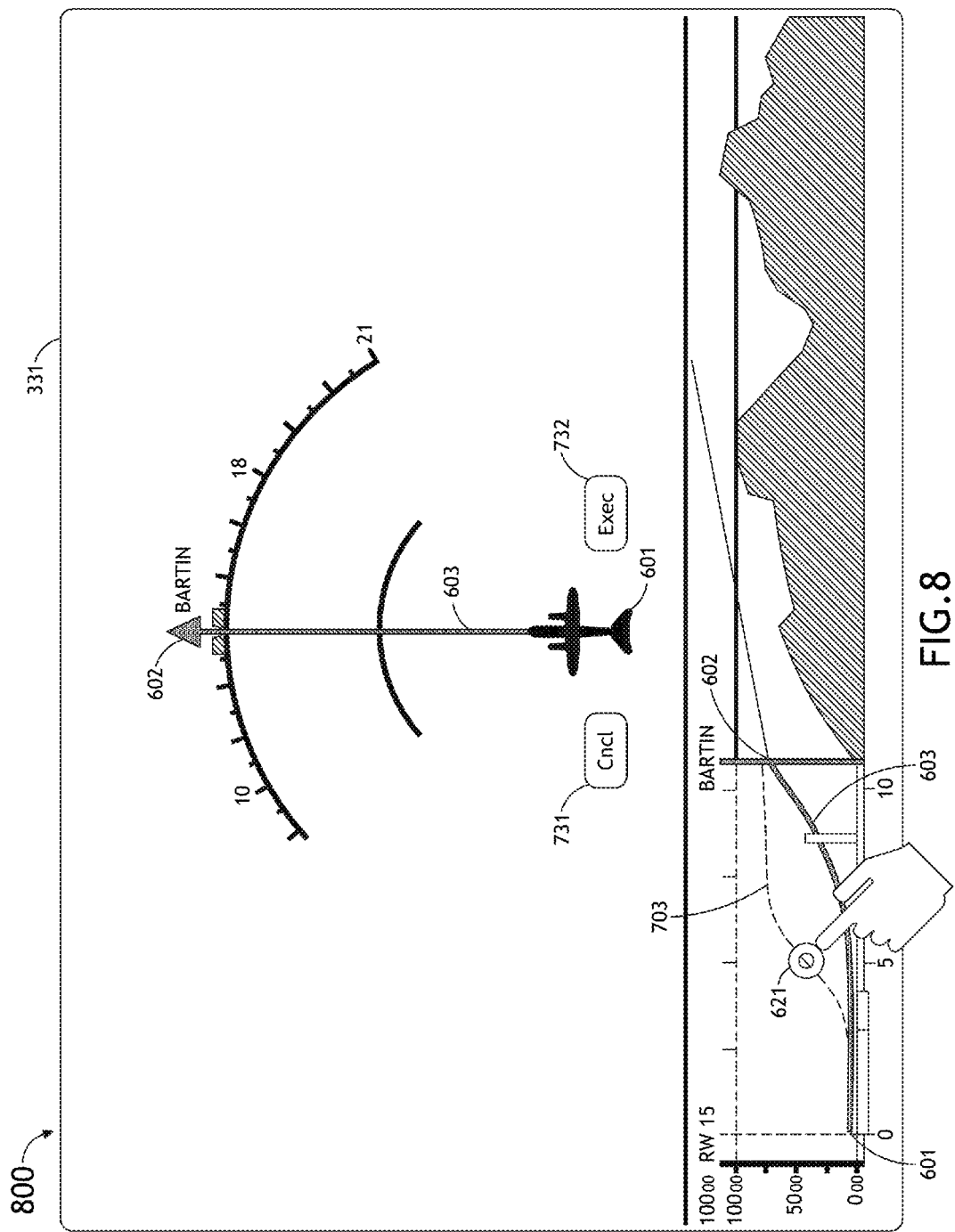
Figure 9:
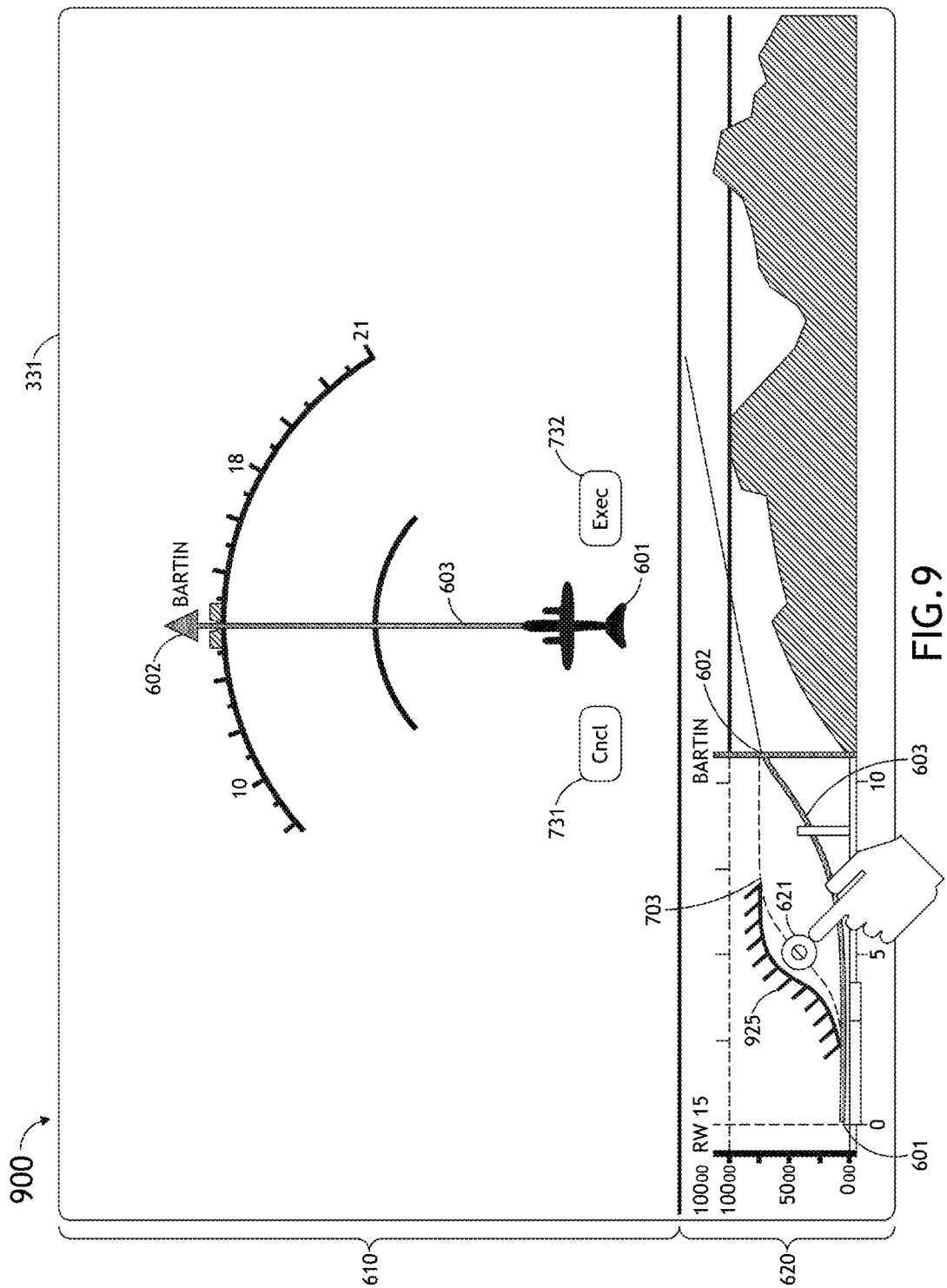
Figure 10:
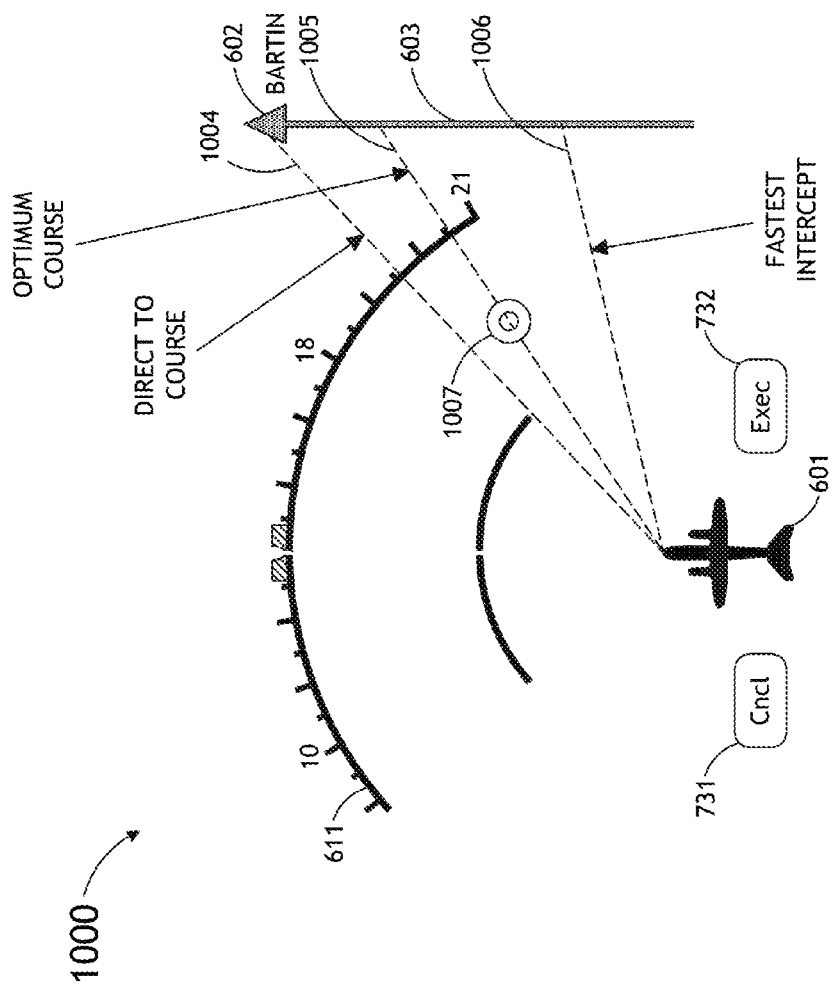
Figure 11:
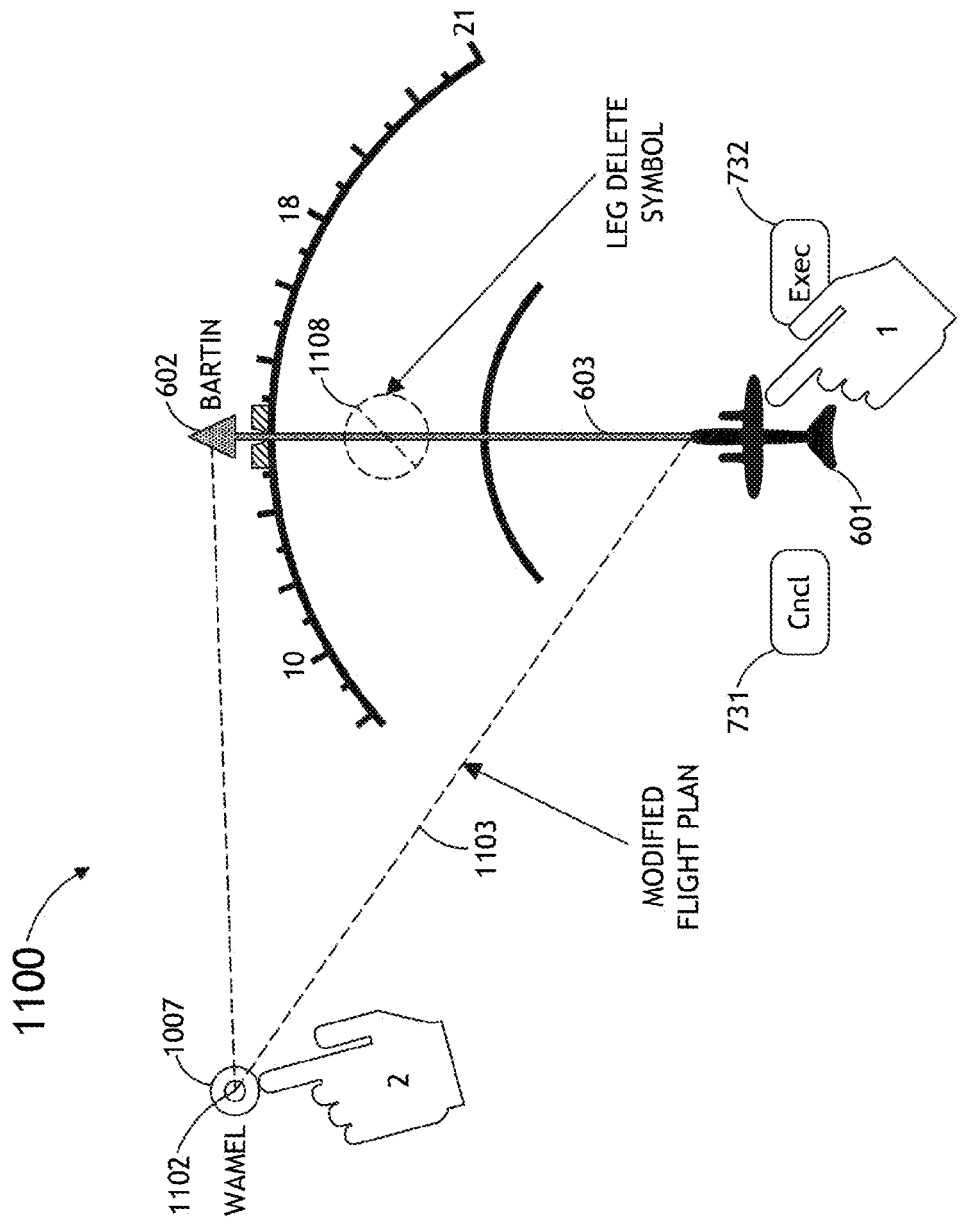
Figure 12:
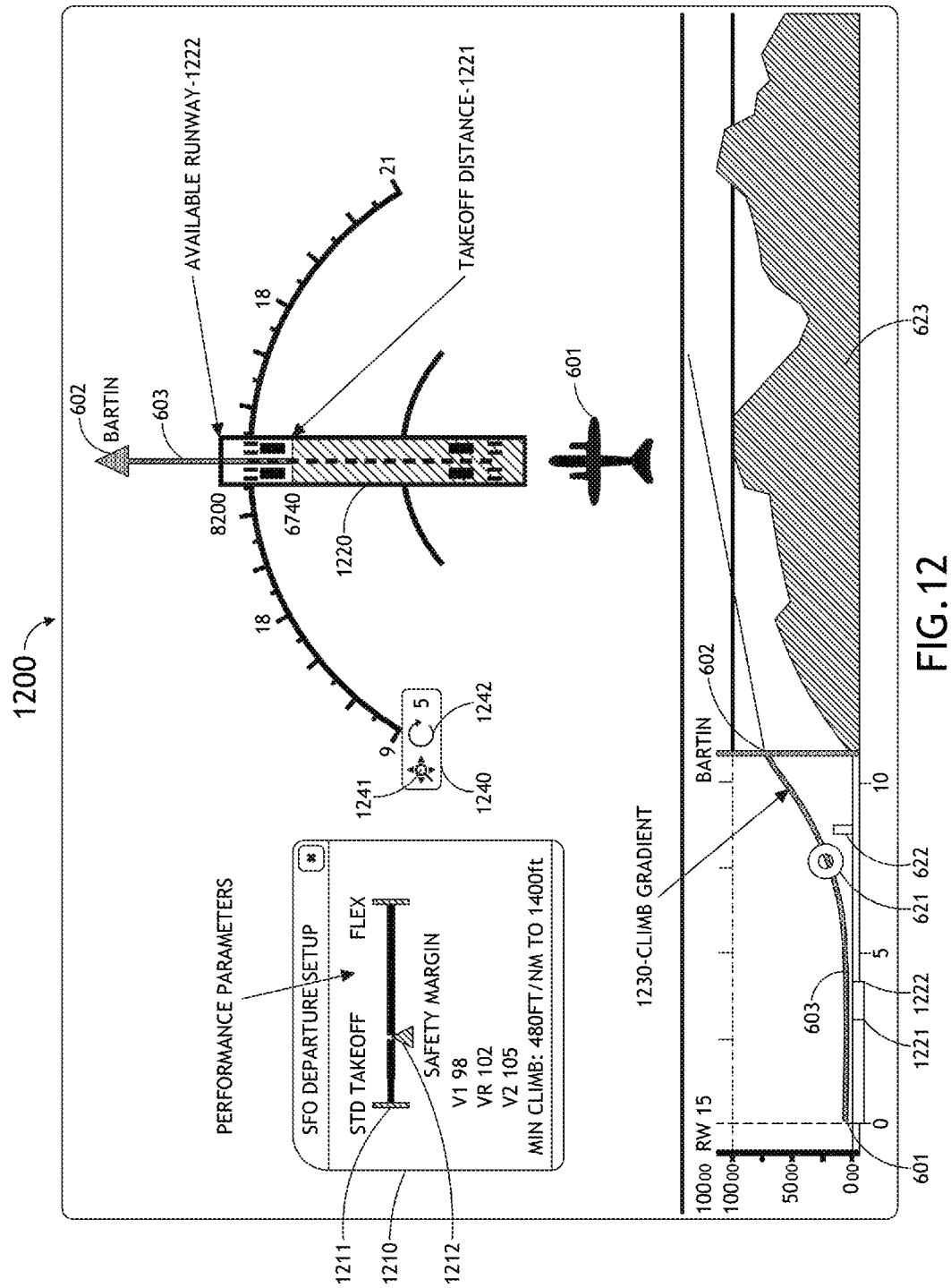
Figure 13:
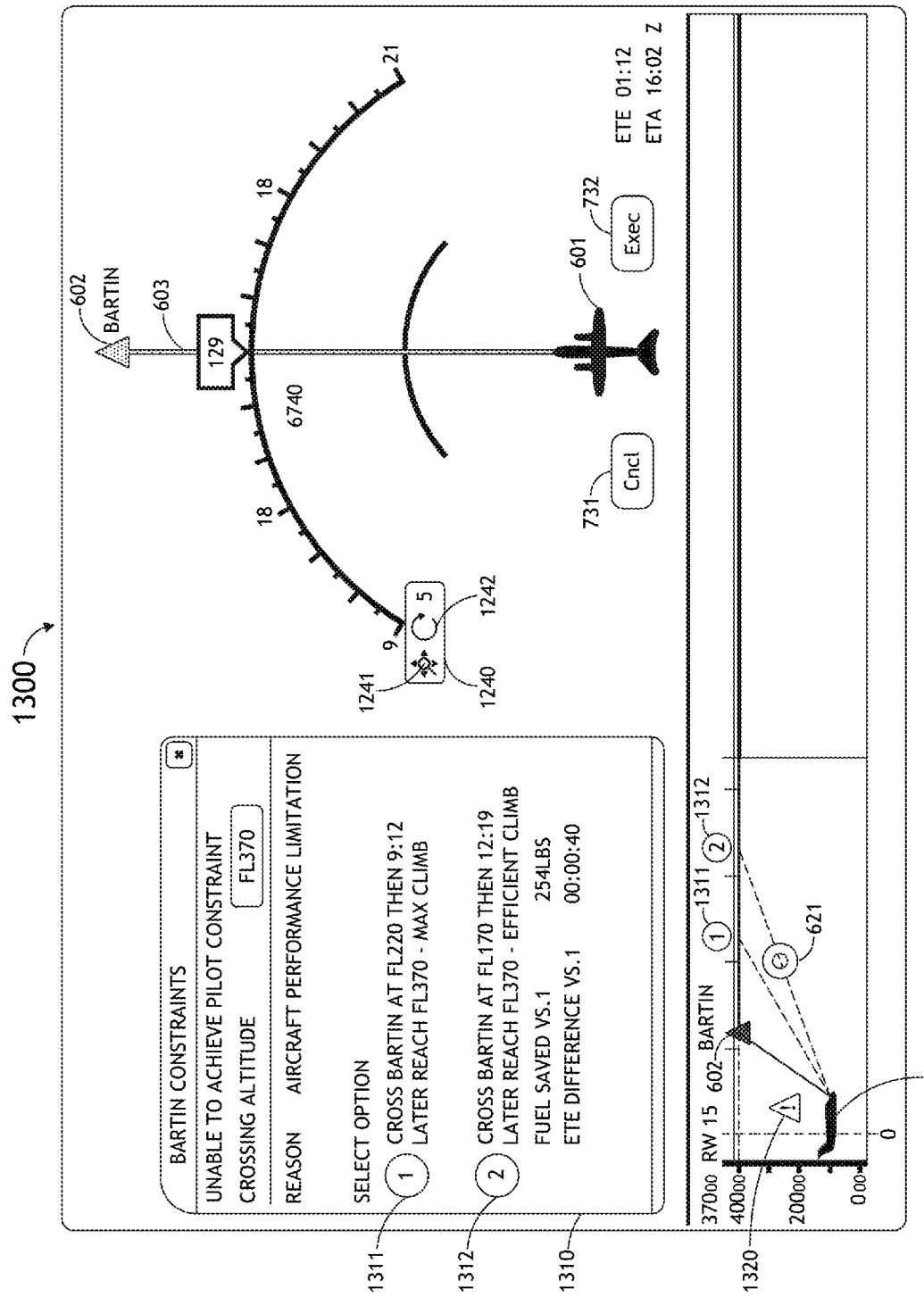

Referring generally to FIGS. 6-13, exemplary screenshots 600, 700, 800, 900, 1000, 1100, 1200, 1300 depict one or more touch-GUIs at various times of exemplary embodiments of the invention. FIGS. 6-9 depict exemplary screenshots 600, 700, 800, 900 associated with exemplarily embodied methods for performing one or more operations of modifying a vertical navigation path or plan. FIGS. 10-11 depict exemplary screenshots 1000, 1100 associated with exemplarily embodied methods for performing one or more operations of modifying a lateral navigation path or plan. FIG. 12 depicts an exemplary screenshot 1200 associated with exemplarily embodied methods to graphically demonstrate automation effects to a user 111, 121, 131, 141 (such as a pilot). FIG. 13 depicts an exemplary screenshot 1300 associated with exemplarily embodied methods to resolve pilot goal performance conflicts.

Figure 6:
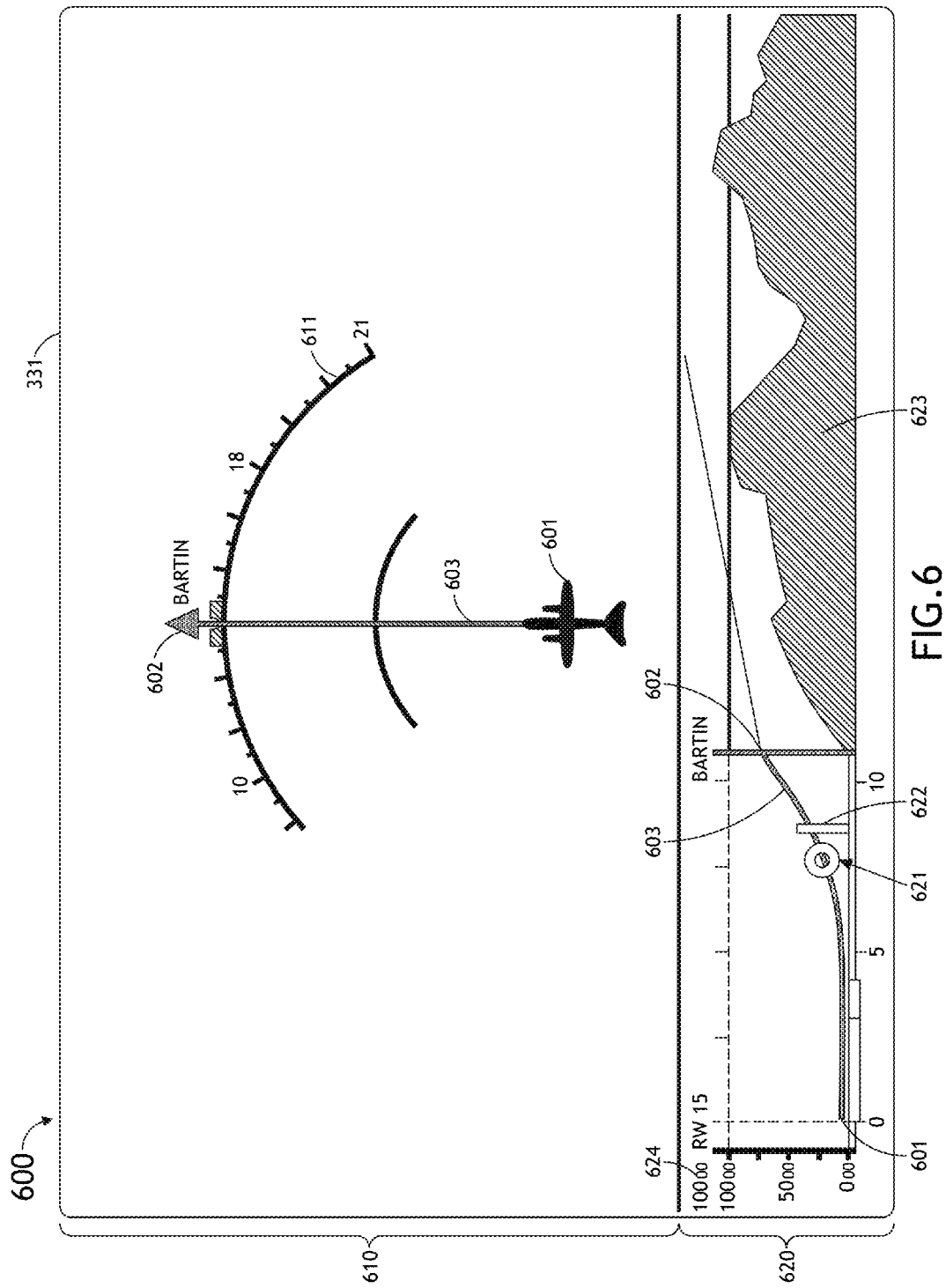
FIGS. 6-13 show exemplary screenshots of touch graphical user interfaces of some embodiments.

Referring now to FIG. 6, an exemplary screenshot 600 (or portion of a screenshot) of a touch-GUI of a user interface system 113, such as a particular touchscreen display system 331, is depicted. In some embodiments, the touchscreen display system 331 (or other user output device 320 or user input/output device 330 of the user interface system 113) presents a multitude of information or data (e.g., user-selectable information or data, user-manipulatable information or data, or interactive information or data) to one or more users (e.g., one or more of user 111, 121, 131, or 141). In some embodiments, the multitude of information or data comprises dynamic content, static content, or some combination of dynamic content and static content. As exemplarily depicted in FIG. 6, the multitude of information or data, which can be presented by the touchscreen display system 331, includes one or more graphical representations of a particular flight path or plan.

Figure 7:
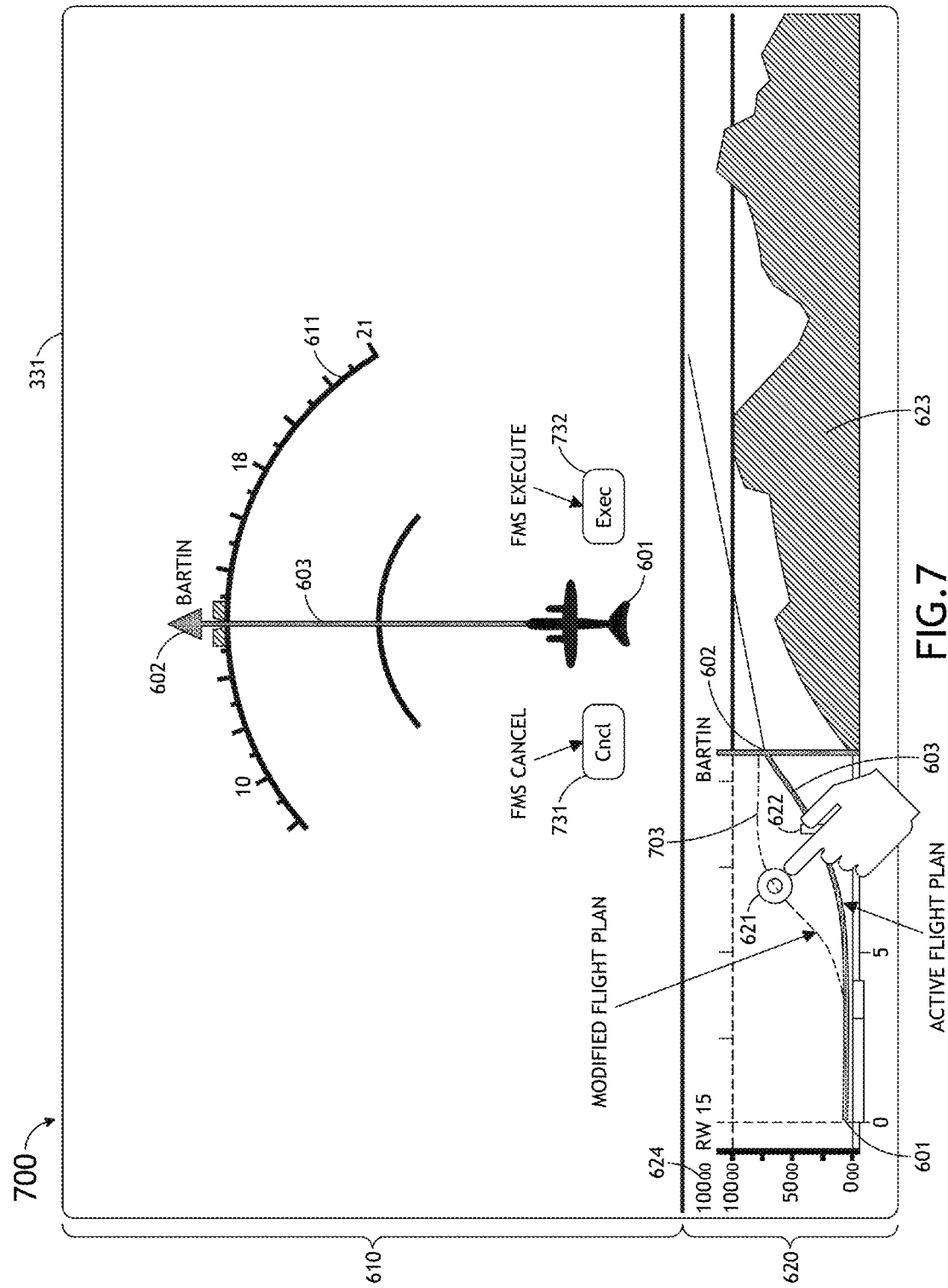

For example, as depicted in FIG. 6, the one or more graphical representations include a lateral graphical representation 610 and vertical graphical representation 620 of an active flight path or plan 603. Similarly, embodiments include the touchscreen display system 331 being configured to present a plurality of flight paths or plans (e.g., an active flight path or plan 603 and a modified flight path or plan 703 (as shown in FIGS. 7-9 and described in detail below)). Additionally, in contemplated embodiments, the one or more graphical representations include flight maps, which may be dynamically rendered and output by a flight map application.

As exemplarily depicted in FIG. 6, the particular flight path represents an active flight path or plan 603 (e.g., a currently set or currently programmed flight path). In some embodiments a particular touchscreen display system 331 is configured to display two or more graphical representations of a particular flight path (e.g., an active flight path or plan 603); for example, the two or more graphical representations of an active flight path or plan 603 may include the lateral graphical representation 610, which depicts a lateral component of the active flight path or plan 603, and the vertical graphical representation 620, which depicts a vertical component of the active flight path or plan 603.

As shown in FIG. 6, the one or more graphical representations (e.g., 610, 620) includes a multitude of information or data configured to be presented to the one or more users 111, 121, 131, 141 (e.g., a pilot onboard the aircraft 110 or a remote pilot) via the one or more graphical representations. For example, the multitude of information includes a current aircraft location 601, a waypoint 602 (wherein the exemplary waypoint 602 has an exemplary waypoint identifier of "BARTIN"), an active flight path or plan 603, heading or track information 611, a vertical flight path selector 621, a lateral flight path selector 1007 (see FIGS. 10-11, which are described in more detail, below), an obstacle 622, surface topology features 623, altitude information 624, other graphically represented information or data (such as a limit indicator 925 (see FIG. 9, which is described in more detail, below)), and the like.

Still referring to FIG. 6, in some embodiments, a user 111, 121, 131, or 141 (e.g., a pilot or navigator onboard the aircraft 110, a remote pilot, or a remote navigator) may select the vertical flight path selector 621 and drag the vertical flight path selector 621 in any direction by performing one or more gestures at, on, or in proximity to the touchscreen display system 331. For example, by pressing the touchscreen display 331 at a point in proximity to the active flight path or plan 603 as graphically represented in the vertical graphical representation 620, the user may select and substantially concurrently (or substantially simultaneously) activate the vertical flight path selector 621; then, the user may complete the gesture (or perform a subsequent gesture or command) to move the vertical flight path selector 621 to a point off of the active flight path or plan 603. This is described in further detail in the description of FIGS. 7-8, below.

Some embodiments include the user interface system 113, such as the touchscreen display system 331, being configured to detect the performance of the gesture. Additionally, upon detecting the performance of the gesture, the touchscreen display system 331 may dynamically (e.g., in at least substantially real time upon detection of new data or changed data) output, send, or transmit detected gesture data to one or more processors (e.g., one or more particular processors located throughout the system topology 100, such as at least one processor 210 of the flight management system 112). The one or more particular processor may then process the received gesture data and then output, send, or transmit updated graphical data to the touchscreen display system 331 in at least substantially real time. Upon receiving (by the touchscreen display system 331) the updated graphical data to present to the user (e.g., user 111) in substantially real time, the touch screen display system 331 dynamically displays the updated graphical data in response to the user's gesture of dragging the vertical flight path selector 621.

In some embodiments, the user interface system 113 (e.g., the touchscreen display system 331) is configured to present a plurality of flight paths or plans, and in further embodiments the user interface system 113 is configured to determine and present a plurality of flight paths or plans. For example, in some implementations, the plurality of flight paths or plans exemplarily comprises one or more of the following: an active flight path or plan 603; a modified flight path or plan (e.g., modified flight path or plan 703 of FIGS. 7 and 8, which is further described below); a preset flight path or plan; a proposed flight path or plan; an alternate flight path or plan; a suggested flight path or plan; an improved or optimized flight path or plan (e.g., a substantially optimal, an optimal, a better, a substantially best, or a best flight path or plan according to a variable, predetermined, or selected set of factors) as compared to another flight path or plan; a direct-to flight path or plan; a fastest intercept flight path or plan; a factor-of-comfort-based flight path or plan; a factor-of-safety-based flight path or plan; a boundary-condition flight path or plan based upon at least one factor of achievable flight plans or paths; another possible flight path or plan; or the like. For example, in particular embodiments, the flight management system 112 and/or the auto-flight system 118 determines an improved or optimized flight path or plan for suggestion to the user 111, 121, 131, or 141 and outputs the improved or optimized flight path or plan to the user interface system 113; the user interface system 113 then presents the suggested improved or optimized flight path or plan to the user 111, 121, 131, or 141. At which point, the user 111, 121, 131, 141 may perform a user gesture in proximity to the user interface system 113 to execute, cancel, or modify the suggested improved or optimized flight path or plan. Likewise, some embodiments of the invention include a flight management system 112 and/or auto-flight system 118 configured to suggest and output a direct-to flight path or plan 1004, a fastest intercept flight path or plan 1006, and an improved or optimized flight path or plan (e.g., 1005) to the user input system 113 for presentation to the user 111, 121, 131, or 141. (See, e.g., FIG. 10, which is described in more detail, below.)

For example, in some embodiments, an improved or optimized flight path or plan is based upon one or more factors (such as a goal, a set of goals, a goal-based factor, a set of goal-based factors (e.g., factors associated with achieving a goal), or the like) as compared to the active flight path or plan 603. In particular exemplary embodiments, the one or more goal-based factors comprise one or more factors which are related (e.g., causally related, correlated, determined to be related, predetermined as being related, having a likelihood of relation, probabilistically related, determined to be likely to be related, or the like) to achieving a particular goal (such as maximizing profit, minimizing cost, shortest path (distance), fastest path (time), performance (e.g., based on fuel optimizations and fastest path (time) optimizations), safety, comfort, some weighted or prioritized combination thereof, or the like). For example, in an exemplary embodiment, an optimum course intercept is based on optimized fuel, time, and comfort constraints.

For example, in some embodiments, the one or more factors associated with determining a flight path or plan (such as an improved flight path or plan, a modified flight path or plan 703, 1007, or the like) comprise a set of constraints; in such embodiments, the constraints may include costs, resources, limitations, or the like. Some exemplary constraints may include fuel; labor; time; distance; comfort constraints (e.g., based upon not exceeding a maximum rate of cabin pressure differential change, not exceeding a maximum degree of vertical inclination, not exceeding a maximum acceleration or deceleration, not exceeding a maximum degree of lateral roll, avoidance of air turbulence, avoidance of undesirable weather systems, or the like); safety constraints (e.g., based upon a factor of safety that is a predetermined percentage above a predetermined limitation of the aircraft 110, such as a physical limitation of the aircraft or a performance limitation of the aircraft); aircraft longevity constraints (e.g., based upon reduction of aircraft stress (such as stress on components (e.g., wings, rivets, welds, exterior, engine(s), or the like)); altitude; cargo shelf-life; availability, speed, and/or quality of connection to a particular off-board communication system; physical obstacles; surface topology obstacles; airspace restrictions (e.g., proximity to or location within domestic airspace, foreign airspace, international airspace, friendly airspace, hostile airspace, restricted airspace, a no-fly zone, or the like); cost and/or resource effects to other flight plans of other aircraft; cost and/or resource effects to flight plans of a part or all of a fleet; cost and/or resource effects to another system, organization, or environment (such as a non-aircraft system, organization, or environment; a system, organization, or environment encompassing more than aircraft; or the like); or the like.

By further example, in embodiments which include a boundary-condition flight path or plan based upon at least one factor of achievable flight plans or paths, the at least one factor of achievable flight plans exemplarily comprises at least one of the following factors: a factor related to one or more attributes associated with physical limitations of the aircraft 110; a factor related to one or more attributes associated with a limitation of at least one particular passenger; a factor related to one or more attributes associated with a limitation which is external to the aircraft 110; or the like.

Referring now to FIGS. 7-8, exemplary screenshots 700, 800 of a touch-GUI of a particular touchscreen display system 331 of an exemplary embodiment are depicted. FIG. 7 exemplarily depicts a screenshot 700 at a point in time (e.g., after a point in time which is depicted in FIG. 6) where the user 111, 121, 131, or 141 (e.g., a pilot or remote pilot) has dragged the vertical flight path selector 621 off of the active flight path or plan 603 in order to avoid the obstacle 622, which is located along the active flight path or plan 603. Similarly, FIG. 8 exemplarily depicts a screenshot 800 at a point in time (e.g., after a point in time which is depicted in FIG. 7) where the user 111, 121, 131, or 141 (e.g., a pilot or remote pilot) has further manipulated or dragged the vertical flight path selector 621 to a subsequent point.

Still referring to FIGS. 7-8, in some embodiments, a user 111, 121, 131, or 141 (e.g., a pilot or navigator onboard the aircraft 110, a remote pilot, or a remote navigator) may select the vertical flight path selector 621 and drag the vertical flight path selector 621 in any direction by performing one or more gestures at, on, or in proximity to the touchscreen display system 331. For example, by pressing the touchscreen display 331 at a point in proximity to the active flight path or plan 603 as graphically represented in the vertical graphical representation 620, the user may select and/or activate the vertical flight path selector 621; then, the user may complete the gesture (or perform a subsequent gesture or command) to move the vertical flight path selector 621 to a point off of the active flight path or plan 603, wherein the point off of the active flight path or plan 603 can comprise a point along a modified flight path or plan 703, as shown in FIGS. 7-8. For example, the user 111, 121, 131, or 141 (e.g., a pilot or remote pilot) may drag the vertical flight path selector 621 to a point of a modified flight path or plan 703 in order to avoid the obstacle 622. In some embodiments, a user can manipulate two or more flight path selectors concurrently, sequentially, or non-sequentially by performing a compound gesture (e.g., a two-finger gesture, a two-hand gesture, or the like), an additional gesture (e.g., an eye tracking gesture, an additional touch gesture, or the like), a command (e.g., a voice command), some combination thereof, or the like.

Some embodiments include the user interface system 113 (e.g., the touchscreen display system 331) being configured to detect the performance of the gesture by the user 111, 121, 131, or 141; upon detecting the performance of the gesture, the touchscreen display system 331 may dynamically (e.g., in at least substantially real time upon detection of new data or changed data) output, send, forward, route, or transmit detected gesture data to a processor (e.g., a processor of the user interface system 113, a processor of another system of the aircraft (such as at least one processor 210 of the flight management system 112, the auto-flight system 118, or the like), an off-board processor (e.g., a processor of a satellite 120, a communication station 130, a data processing system 132, a network operations center 122, another vehicle 140, or the like), some combination of processors thereof, or the like), another information handling device (not shown in FIG. 1) connected to the network 124, another data processing system (not shown in FIG. 1) connected to the network 124, or the like. The particular processor may process the gesture data and then output, send, forward, route, or transmit updated graphical data to the touchscreen display system 331 in at least substantially real time. Upon receiving (for example, by the touchscreen display system 331) the updated graphical data to present to the user (e.g., 111) in substantially real time, the touch screen display system 331 dynamically displays the updated graphical data in response to the user dragging the vertical flight path selector 621.

In further reference to FIGS. 7-8, some embodiments include determining (for example, by the flight management system 112, by the auto-flight system 118, and/or by another element of the overall system topology 100) attributes (e.g., the shape or the curvature of the modified flight path or plan 703 which is presented to the user 111, 121, 131, or 141) of the modified flight path or plan 703 based upon one or more factors, such as a goal-based factor or a plurality of weighted or prioritized goal-based factors. For example, in some embodiments, at least one processor 210, 211 of the flight management system 112 and/or auto-flight system 118 determines the shape of the modified flight path or plan 703 by performing a set of operations (e.g., algorithmic operations, simulation operations, computational operations, weighting operations, prioritization operations, some combination thereof, or the like), wherein a particular set of operations to be performed depend at least in part upon the particular goal-based factors currently being applied (or having been selected to be applied) to the modified flight path or plan 703. For example, a set of operations may include performing curve smoothing operations (such as by utilizing a Fourier approximation function), single- or multi-variate linear regression operations, linear programming operations (e.g., by optimizing (such as by maximizing or minimizing) by utilizing the simplex method), non-linear optimization operations, stochastic process operations, forecasting operations (e.g., by recursively forecasting based upon trailing actual flight path data for a predetermined trailing time period), or the like. For example, in a particular exemplary embodiment where the goal-based factors include a comfort constraint which includes a maximum rate of cabin pressure differential change constraint, the flight management system 112 (and/or the auto-flight system 118) outputs an acceptable modified flight path or plan such that the outputted acceptable modified flight path or plan conforms to acceptable rates (e.g., such as an average or median rate) at which the particular aircraft 110 could ascend or descend along the modified flight path or plan 703 without violating the maximum rate of cabin pressure differential change constraint. Additionally, in some embodiments which include a plurality of weighted or prioritized goal-based factors, outputting a particular acceptable modified flight path or plan, which conforms to the plurality of constraints, is determined by performing weighting or priority operations.

Still referring to FIGS. 7-8, the user 111, 121, 131, or 141 (e.g., a pilot) can manipulate (e.g., drag) the vertical flight path selector 621 in various directions as an updated acceptable modified flight path or plan (e.g., modified flight path or plan 703) is dynamically presented to the user 111, 121, 131, or 141. In some embodiments, as the user drags the vertical flight path selector across the touchscreen display system 331, the updated acceptable modified flight path or plan is dynamically updated such that the updated acceptable modified flight path or plan contains the current position of the vertical flight path selector 621 (e.g., the updated acceptable modified flight path or plan at least substantially corresponds to a particular acceptable modified flight path or plan which includes the current position of the vertical flight path selector 621).

Additionally, in some embodiments, the updated acceptable modified flight path or plan is dynamically updated and dynamically presented to the user 111, 121, 131, or 141 based upon the current position of the aircraft 110 in flight. In some embodiments, the user 111, 121, 131, or 141 can preview the dynamically updated acceptable modified flight path or plan in substantially real time. As such, if the user (e.g., the user 111, such as a pilot) determines to change the active flight path or plan 603 to the modified flight path or plan 703, the user can perform a gesture (e.g., a touch gesture) in proximity to an execute icon 732 (or perform another gesture (e.g., an eye tracking gesture), another command (e.g., a voice command), or the like) to execute the modified flight path 703 as being an updated or new active flight path or plan. As such, in exemplary embodiments, upon a user interface system's 113 (e.g., touchscreen display's 331, flight control panel's 450, or the like) detection or recognition of a user gesture or command to execute the modified flight path or plan 703, the user interface system 113 sends a signal or data to a processor (such as at least one processor 210, 211 of the flight management system 112 and/or the auto-flight system 118) to execute the modified flight path or plan 703. Once the processor receives the signal or data, the processor (such as at least one processor 210, 211 of the flight management system 112 and/or the auto-flight system 118) processes the signal or data associated with the detection or recognition of the user execution gesture or command. The processor then sets the modified flight path or plan 703 as the current or new active flight path or plan; upon setting the modified flight path or plan 703 as the current or new active flight path or plan, the processor may output updated graphical data to the touchscreen display system 331 so that the executed flight path or plan is presented to the user as the active flight path or plan.

In further exemplary embodiments, the processor (such as at least one processor 210, 211 of the flight management system 112 and/or the auto-flight system 118) sends or forwards to one or more off-board systems, apparati, or devices (such as a communication station 130 (e.g., an air traffic control communication station), another vehicle 140, a data processing system 132, a component thereof (e.g., a processor thereof), some combination thereof, or the like) the signal or data associated with the detection or recognition of the user gesture or command to execute the modified flight path or plan 703. In further embodiments, the processor (such as at least one processor 210, 211 of the flight management system 112 and/or the auto-flight system 118) waits to finalize execution of the modified flight path or plan 703 until the processor receives approval (e.g., a notification of approval) or a receipt verification for execution of the modified flight path or plan 703 from at least one off-board system (e.g., an air traffic control communication station 130, or the like).

For example, in some embodiments, the user 131 (e.g., an air traffic controller) may receive a request for approval to execute the modified flight path or plan 703 from the user 111 (e.g., the pilot of the aircraft 110). In an exemplary embodiment, the request for approval is exemplarily routed from the flight management system 112 (or the auto-flight system 118) to the antenna system 116 to the communication system 130 to the user 131 (e.g., the air traffic controller); then, for example, the user 131 (e.g., the air traffic controller) may interface with a computing device of the communication station 130 to approve or deny the request for execution of the modified flight path or plan 703, and a notification of approval or a notification of denial is sent, forwarded, or routed to the flight management system 112 (or the auto-flight system 118) of the aircraft 110. In further embodiments, the user 131 (e.g., the air traffic controller) may also further modify the modified flight path or plan 703 or propose an alternate modified flight path or plan; and likewise, the further modified flight path or plan or proposed alternate flight path or plan may be routed to the flight management system 112, the auto-flight system 118, and/or the user interface system 113 of the aircraft 110 to be presented to the user 111 (e.g., the pilot) for acceptance or approval.

In still further embodiments, an automated or semi-automated process of the system topology 100 (such as a process running on a computing device of the communication station 130) receives a request for approval to execute the modified flight path or plan 703 from the user 111, and the automated or semi-automated process issues a notification of approval or a notification of denial, which is sent, forwarded, or routed to the flight management system 112 and/or the auto-flight system 118 of the aircraft 110.

Additionally, if the user (e.g., the user 111, such as the pilot) determines to cancel or discard the modified flight path or plan 703, the user can perform a gesture (e.g., a touch gesture) in proximity to a cancel icon 731 (or perform another gesture (e.g., an eye tracking gesture), another command (e.g., a voice command), or the like) to cancel and discard the modified flight path or plan 703. In some embodiments, cancelling or discarding the modified flight path or plan 703 maintains the active flight path or plan 603; while in other embodiments, upon cancelling or discarding the modified flight path or plan 703, an alternate flight path or plan may be proposed or presented to the user 111.

Referring now to FIG. 9, an exemplary screenshot 900 of a touch-GUI of a particular touchscreen display system 331 of an exemplary embodiment is depicted.

As shown in FIG. 9, the one or more graphical representations (e.g., 610, 620) includes a multitude of information or data configured to be presented to the one or more users 111, 121, 131, 141 (e.g., a pilot onboard the aircraft 110 or a remote pilot) through the one or more graphical representations. In some embodiments, the multitude of information or data includes a limit indicator 925, as well as other information or data previously described in reference to FIGS. 6-8, above (such as the current aircraft location 601, the waypoint 602, the active flight path or plan 603, the modified flight path or plan 703, heading or track information 611, the vertical flight path selector 621, the lateral flight path selector 1007 (see FIGS. 10-11 described in more detail, below) the obstacle 622, surface topology features 623, altitude information 624, other graphically represented information or data, or the like).

In some embodiments, one or more limit indicators (e.g., limit indicator 925) are presented to the user 111, 121, 131, or 141 by the user interface system 113 (e.g., the touchscreen display 331). In some embodiments and as shown in FIG. 9, the limit indicator 925 graphically indicates to a user 111, 121, 131, or 141 (e.g., a pilot of the aircraft 110, a remote pilot of the aircraft 110, an air traffic controller, or the like) a region in space (or a region in space-time) that contains points of unacceptable flight plans. For example, unacceptable flight paths or plans may include unachievable flight paths or plans (e.g., flight paths or plans which are beyond the physical limitations of the aircraft 110, or the like), flight paths or plans which fail to meet some or all of the goals or objectives of a set of goal-based factors, flight paths or plans which violate one or more constraints of a set of constraints, or the like. That is, the limit indicator 925 represents points or regions where moving a flight path selector (e.g., one or more of the vertical flight path selector 721 or the lateral flight path selector 1007) would result in a modified flight path or plan (e.g., modified flight path or plan 703 or 1103) which is unacceptable to a set of flight goals, is substantially impossible or physically impossible, is unsafe (e.g., to prevent an aircraft from approaching a determined or predetermined proximity to an obstacle 622, surface topology features 623, projectiles, a range of hostile weaponry, other vehicles 140, satellites 120, or the like), or the like. In exemplary embodiments having an implemented set of one or more goal-based factors, the limit indicator 925 would display (and be dynamically updated) to represent points in space which would violate one (or a threshold number of) constraints of the particular set of one or more goal-based factors. While it is fully contemplated that some embodiments include one or more limit indicators (e.g., limit indicator 925) being presented (e.g., drawn or graphically represented) on a lateral map, a vertical map, a two-dimensional map depicting some combination of vertical and lateral components, a three-dimensional map, a four-dimensional space-time map, or the like, other embodiments include alternate methods and means of presenting limit indicators. For example, in embodiments where a particular limit indicator is presented on a lateral map, the limit indicator may represent regions where the flight plan would enter or include a prohibited area, wherein the prohibited area may include or be based upon temporary flight restrictions, special use airspace, weather threat areas, or the like.

In some embodiments, when the user 111, 121, 131, or 141 attempts to drag the flight path selector to a point of a region of the limit indicator 925, the flight management system 112 performs a limit exceeded operation. For example, performing the limit exceeded operation may include at least one of the following: cancelling the flight path modification; setting the flight path selector at a point of an acceptable modified flight path or plan (e.g., a closest acceptable modified flight path or plan); alerting or notifying the user 111, 121, 131, or 141; requesting override authorization (e.g., requesting goal or constraint override authorization); requesting a modification to the set of one or more goal-based factors; or the like. Additionally, in some embodiments, performing the limit exceeded operation may include communicating information or data with an off-board system (e.g., communication station 130, such as air traffic control) or an off-board location. For example, performing a limit exceeded operation may include sending a request for override authorization from the flight management system 112 (and/or the auto-flight system 118) of the aircraft 110 to a user 131 (e.g., an air traffic controller) of the communication station 130; likewise, performing a limit exceeded operation may further include at least one of receiving approved override authorization or receiving disapproved override authorization from the communication station 130 (e.g., air traffic control).

For example, in some embodiments, the limit indicator 925 is based upon one or more factors (such as a goal-based factor or a set of goal-based factors). In particular exemplary embodiments, the one or more goal-based factors comprise one or more factors which are related (e.g., causally related, correlated, determined to be related, predetermined as being related, having a likelihood of relation, probabilistically related, determined to be likely to be related, or the like) to achieving a particular goal (such as maximizing profit, minimizing cost, shortest path (distance), fastest path (time), safety, comfort, some weighted or prioritized combination thereof, or the like).

For example, in some embodiments, the one or more factors associated with determining the limit indicator 925 comprise a set of constraints; in such embodiments, the constraints may include costs, resources, limitations, or the like. Some exemplary constraints may include fuel; labor; time; distance; comfort constraints (e.g., based upon, not exceeding a maximum rate of cabin pressure differential change, not exceeding a maximum degree of vertical inclination, not exceeding a maximum acceleration or deceleration (such as not exceeding a maximum climb rate (e.g., not exceeding a maximum vertical acceleration or deceleration)), not exceeding a maximum degree of lateral roll, avoidance of air turbulence, avoidance of undesirable weather systems, or the like); safety constraints (e.g., based upon a factor of safety (e.g., one or more values (e.g., percentages) which exceed determined physical limitations of the aircraft 110, such as physical limitations of the aircraft or performance limitations of the aircraft, or the like); aircraft longevity constraints (e.g., based upon reduction of aircraft stress (stress on components (e.g., wings, rivets, welds, exterior, engine(s), or the like)); altitude; cargo shelf-life; availability, speed, and/or quality of connection to a particular off-board communication system; physical obstacles; surface topology obstacles; temporary flight restrictions or airspace restrictions (e.g., proximity to or location within domestic airspace, foreign airspace, international airspace, friendly airspace, hostile airspace, special use airspace, weather threat areas, restricted airspace, a no-fly zone, or the like); cost and/or resource effects to other flight plans of other aircraft; cost and/or resource effects to flight plans of a part or all of a fleet; cost and/or resource effects to another system, organization, or environment (such as a non-aircraft system, organization, or environment; a system, organization, or environment encompassing more than aircraft; or the like); or the like.

By further example, in embodiments which include the limit indicator 925 being based upon at least one factor of achievable flight plans or paths, the at least one factor of achievable flight plans exemplarily comprises at least one of the following factors: a factor related to one or more attributes associated with physical limitations of the aircraft 110; a factor related to one or more attributes associated with a limitation of at least one particular passenger; a factor related to one or more attributes associated with a limitation which is external to the aircraft 110; or the like.

Additionally, in some embodiments, the flight management system 112 and/or the auto-flight system is configured to filter (or configured to filter subject to an override by a user 111, 121, 131, or 141) a selectable space and/or an active area for the flight path selector (e.g., the vertical flight path selector 621 or the lateral flight path selector 1007 (as depicted in FIGS. 10-11 and described below)) based upon performance of operations associated with determining a region of the limit indicator 925.

Referring now to FIGS. 10-11, exemplary screenshots 1000, 1100 associated with exemplarily embodied methods for performing one or more operations of modifying a lateral navigation path or plan are depicted. Additionally, for example, the user interface system 113 (e.g., touchscreen display system 331 and touchscreen flight mode control panel 450), flight management system 112, the auto-flight system 118, and/or a hybrid FMS/auto-flight system may be configured to handle and respond to user interactions (such as by user gestures or commands), may be configured to present graphical information and data, and may be configured to communicate with other on-board or off-board systems or devices of the overall system 100 topology, as described throughout.

Referring now to FIG. 10, an exemplary screenshot 1000 of a touch-GUI of a user interface system 113 (such as a particular touchscreen display system 331) of an exemplary embodiment is depicted. As shown in FIG. 10, the exemplary screenshot 1000 represents the view of a touchscreen display 331 which a pilot may encounter under a scenario where the pilot is attempting to join a flight plan while flying a runway heading or track during a typical takeoff.

As depicted in FIG. 10, the particular touchscreen display system 331 is configured to display the lateral graphical representation 610 (as well as other information or other graphical representations). The lateral graphical representation 610 may include a multitude of information or data configured to be presented to the user. For example, the multitude of information or data of the lateral graphical representation 610 may include a current aircraft location 601, a waypoint 602, an active flight path or plan 603, heading or track information 611, a lateral flight path selector 1007, proposed flight paths or plans (e.g., a direct to course flight path or plan 1004, an optimum course flight path or plan 1005, a fastest intercept flight path or plan 1006, or the like), other graphically represented information or data, and the like.

As shown in FIG. 10, in some embodiments, the user interface system 113 (e.g., touchscreen display system 331), flight management system 112, and/or the auto-flight system 118 present multiple proposed flight paths or plans (e.g., a direct to course flight path or plan 1004, an optimum course flight path or plan 1005, a fastest intercept flight path or plan 1006, or the like) to the user 111, 121, 131, 141 (e.g., a pilot or remote pilot) to rejoin (e.g., intercept) the active flight path or plan 603 or to execute some other modified flight path or plan (e.g., a non-standard or "free set" flight path or plan). For example, one problem which often arises during takeoff is that most runway headings or tracks begin misaligned with respect to flight plans; that is, an immediate discontinuity between the runway heading or track and the flight plan occurs because the runway heading or track required for takeoff does not directly align with the flight plan. Embodiments provide solutions to this problem, among other benefits. In some embodiments, the flight management system 112, the auto-flight system 118, and/or the user interface system 113 are configured to dynamically output, present, and update the proposed flight paths or plans (e.g., a direct to course flight path or plan 1004, an optimum course flight path or plan 1005, a fastest intercept flight path or plan 1006, or the like) as the aircraft's position and/or orientation changes during flight.

Currently, most flights begin the same way; pilots are cleared to takeoff from the origin airport and fly a runway heading or track climbing until the aircraft reaches a particular altitude. The problem which typically arises is that most flight plans begin misaligned in relation to the requisite runway heading or track such that an immediate discontinuity with the flight plan ensues. Current aviation systems resolve this discontinuity between the runway heading or track and the flight plan through two disjointed pieces of automation: an auto-flight system and a flight management system. Pilots currently use the auto-flight system to fly a manual heading or track until cleared to their flight plan by air traffic control. Pilots typically then create a heading or track intercept to their flight plan and arm a lateral navigation ("LNAV") of the flight management system to engage when near the flight plan. Alternatively, the pilot could be cleared by air traffic control to a waypoint in their flight plan; however, this requires the pilot to go "heads down" and program an FMS modification, execute the change, and then arm the LNAV. These procedures require extensive training and understanding of the modes and transitions of current implemented, but disjointed, flight management systems and auto-flight systems. Furthermore, currently implemented flight management systems fail to accurately calculate time-to-destination and fuel estimates while flying in such heading or track modes.

Therefore, in contemplated embodiments a proposed solution harmonizes the auto-flight system 118 and flight management system 112 by providing likely flight path options (e.g., proposed flight paths or plans 1004, 1005, 1006) to the pilot. For example, as shown in FIG. 10, the user 111, 121,

131, 141 is automatically presented with three selectable and dynamically updated proposed flight paths or plans 1004, 1005, 1006: a) a fastest intercept flight path or plan; b) an optimum course flight path or plan 1005; and c) a direct-to course flight path or plan 1004. In exemplary embodiments, the system presents the optimum course flight path or plan 1005 as the default selected route.

In a particular exemplary embodiment, the optimum course flight path or plan 1005 is optimized based upon time, fuel, and comfort factors. Performance (e.g., based upon time and fuel factors) calculations are based on the selected route. In some embodiments, the system automatically displays multiple user selectable flight intercept lines/options (e.g., 1004, 1005, 1006) just after takeoff and preloads a particular flight path or plan (such as the optimum course flight path or plan 1005) as the default mode. Presentation of multiple user selectable flight intercept lines/options (e.g., proposed flight paths or plans 1004, 1005, 1006) allows for the user 111, 121, 131, or 141 (e.g., the pilot) to select and execute one of the proposed flight paths or plans 104, 105, 106 with a single button press or performance of a single sequence of one or more user gestures. Additionally, if automation determines that the aircraft 110 cannot intercept the first waypoint, the automation will auto-sequence the proposed flight paths or plans 1004, 1005, 1006 for a subsequent waypoint. For example, if air traffic control holds the aircraft on a heading or track which results in the aircraft overflying the first waypoint, the automation will auto-sequence to the next available waypoint of the active flight path or plan 603. Also, the pilot can alter the intercept heading or track for a flight plan to any heading or track desired or needed; that is, the pilot is not limited to selecting from the three proposed routes (e.g., 1004, 1005, 1006). While FIG. 10 refers to a takeoff situation, it is fully contemplated that the principles illustrated and described with respect to FIG. 10 apply to any flight plan offset or discontinuity condition or any other situation where a pilot or other user may select a proposed flight path or plan 1004, 1005, 1006 or may set a non-standard flight path or plan.

In further reference to FIG. 10, embodiments allow the user 111, 121, 131, or 141 to interact with the user interface system 113 (e.g., touchscreen display system 331) to select a proposed flight path or plan (e.g., 1004, 1005, or 1006) or "free set" some other flight path or plan. For example, during takeoff, the user 111, 121, 131, or 141 may interact with the touchscreen display system 331 to set a heading intercept by dragging the lateral flight path selector 1007 to one of the dynamically updated proposed flight paths or plans (e.g., 1004, 1005, or 1006). Alternatively, the user 111, 121, 131, or 141 may "free set" a heading intercept to join the active flight path or plan 603 by dragging the lateral flight path selector 1007 to a point other than one of proposed flight path or plan 1004, 1005, 1006; while a user is manipulating (e.g., dragging) the lateral flight path selector 1007, a dynamically updated modified flight path or plan may be presented to the user 111, 121, 131, or 141 such that the user 111, 121, 131, or 141 can preview the dynamically updated modified flight path or plan.

As depicted in FIG. 10, in some embodiments, when the lateral vertical path selector 1007 is dragged, the proposed flight path or plan is temporarily shown. In some implementations, the optimum course flight path or plan 1005 is loaded by default; however, the user interface system 113 allows the user to select one of the other proposed courses (e.g., 1004 or 1006) or a free set flight path or plan. That is, in some embodiments, the lateral flight path selector 1007 is not bound to one of the proposed flight paths or plans; rather, the flight management system 112 and/or the auto-flight system 118 (and/or the user interface system 113) is configured such that the lateral flight path selector 1007 may be adjusted to some other acceptable flight path or plan (e.g., a free set flight path or plan) by the user moving the lateral flight path selector 1007 to a point off of the proposed flight paths or plans. Additionally, the user 111, 121, 131, or 141 may tap on a particular proposed flight path or plan (e.g., one of 1004, 1005, or 1006) to set the particular proposed flight path or plan as the modified flight path or plan.

Additionally, in some embodiments, the user 111, 121, 131, or 141 can execute or cancel a proposed flight path or plan (e.g., 1004, 1005, or 1006) or a free set flight path or plan as described with reference to FIGS. 7-8, above. For example, in some embodiments, the user 111, 121, 131, or 141 can execute or cancel a proposed flight path or plan (e.g., 1004, 1005, 1006) or a free set flight path or plan by performing a gesture (e.g., a touch gesture) at or in proximity to the execute icon 732 or the cancel icon 731, respectively. In some embodiments, the user can perform a gesture (e.g., a touch gesture, an eye gesture, or the like), a command (e.g., a voice command), some combination thereof, or the like to execute or cancel a particular modified flight path or plan. Once the user executes a proposed flight path or plan (e.g., 1004, 1005, 1006) or executes a free set flight path or plan, the aircraft will join (or rejoin) the active flight path or plan 603 along the particular executed flight path or plan.

Additionally, in some embodiments, if the pilot or aircraft 110 overflies a particular waypoint (e.g., waypoint 602) of the active flight path or plan 603 while the aircraft is off-course, the flight management system 112 and/or the auto-flight system 118 is configured to automatically route (e.g., sequence) a modified flight path or plan to a subsequent waypoint (e.g., a next waypoint) of the active flight path or plan 603.

Accordingly, once a user (e.g., a pilot) or aircraft 110 is cleared to join a particular flight path or plan (e.g., a user selected flight path or plan) by air traffic control, the user only needs to perform a gesture (e.g., a touch gesture), a single button press, or a command to execute the particular flight path or plan. Embodiments of the invention allow the pilot to bypass or forego performing a series of cumbersome operations as would be required using currently implemented avionics.

Referring now to FIG. 11, an exemplary screenshot 1100 of a touch-GUI of a user interface system 113 (such as a particular touchscreen display system 331) of an exemplary embodiment is depicted. As shown in FIG. 11, embodiments of the invention allow a user 111, 121, 131, or 141 (e.g., a pilot, remote pilot, or aircraft controller) to perform a gesture (e.g., a touch gesture or eye gesture) or command (e.g., a voice command) to modify a flight path or plan by selecting, adding, or removing a particular waypoint 1002 to or from a particular flight path or plan (e.g., an active flight path or plan 603, a modified flight path or plan 1103, a proposed flight path or plan 1004, 1005, 1006, or the like).

Still referring to FIG. 11, for example, an exemplary embodiment of the invention allows the user 111, 121, 131, 141 to create a modified flight path or plan 1103 by adding a new waypoint 1102 by performing one or more touch gestures. As exemplarily shown in FIG. 11, the user can drag his or her finger from an aircraft symbol 601 (which represents the location of the aircraft 110) to the new waypoint 1102 (e.g., "snapping" to a waypoint symbol) to create the modified flight path or plan 1103. ("Snapping" may include setting a flight path selector (e.g., 621, 1107) at a waypoint symbol (e.g., 602, 1102) upon determining that a user has dragged (or dragged and free dropped) the flight path selector to a point within a predetermined proximity to a waypoint symbol.) As such, if one of the active flight path or plan's legs conflicts with the modified flight path or plan 1103 (e.g., a leg which would no longer be traveled if the modified flight path or plan 1103 is executed), the conflicting leg may be presented with a delete symbol 1108 (e.g., marked for deletion) pending execution of, cancellation of, or further modification to the modified flight path or plan 1103; in other embodiments, the conflicting leg of the modified flight path or plan 1103 may be automatically deleted from the modified flight path or plan. While FIG. 11 exemplarily depicts a user 111, 121, 131, or 141 snapping the flight plan to the new waypoint 1102, it is further contemplated that the user 111, 121, 131, or 141 may drag the flight path selector 1007 and free drop the flight path selector 1007 anywhere (including areas without navigation aids ("NAVAIDs", such as waypoints 1102, 602) or areas lacking displayed NAVAIDs). In the event that the system determines that the user 111, 121, 131, or 141 has performed a free drop, the system will create an additional waypoint and connect the flight plan to the created additional waypoint, and likewise, any conflicting leg of the modified flight path or plan may be marked for deletion, as described above.

In some embodiments, users can drag from and drop at any point; that is, users are not limited to dragging from points along active flight path legs or selecting/dragging the current aircraft location 601. Additionally, some embodiments allow a user 111, 121, 131, or 141 to perform waypoint-to-waypoint additions or modifications. For example, a user may select (e.g., by touching) a particular waypoint then drag the selected waypoint to a new point on the touchscreen display system 331 to create a modified flight path or plan. As a particular example, a user 111, 121, 131, 141 may drag from the BARTIN waypoint 602 to any other waypoint to create a new leg starting at the BARTIN waypoint 602. Furthermore, users may drag waypoints to connect to other published or unpublished three-dimensional routes or instrument procedures (such as Standard Instrument Departures ("SIDs"), Standard Terminal Arrival Routes ("STARs"), arrivals, or the like).

Furthermore, some embodiments allow a user 111, 121, 131, or 141 (e.g., a pilot, remote pilot, or air traffic controller) to perform a gesture (e.g., a touch gesture or eye gesture) or command (e.g., a voice command) to remove a particular waypoint from a particular flight path or plan by selecting the particular waypoint and executing a delete waypoint operation. As such, in some embodiments, upon deletion of the particular waypoint, the flight management system 112 and/or the auto-flight system 118 is configured to automatically update attributes (such as connection legs, curvature, or the like) of the modified flight path or plan.

Additionally, in some embodiments, where the user interface system 113 (such as a particular touchscreen display 331), the flight management system 112, and/or the auto-flight system 118 are configured such that performance of a particular touch gesture (e.g., a finger swipe, or finger pinch) is set to pan a map or zoom in, the touchscreen display system 331, the flight management system 112, and/or the auto-flight system 118 may be configured such that performance of a unique, a semi-unique, or compound touch gesture can be set for the user to create a modified flight path or plan. For example, the unique, semi-unique, or compound touch gesture may include a multi-finger swipe touch gesture, a press-and-hold touch gesture, a press-and-hold-then-swipe touch gesture, a non-finger touch gesture, some combination thereof, or the like. Additionally, in some embodiments, a touchscreen display system 331 presents a graphical attribute to a user, wherein the graphical attribute (e.g., a symbol, a flashing attribute, a shade, a shape, a color, a size, a border, or the like) represents a particular gesture which needs to be performed to complete a particular function; for example, a graphical icon which can be manipulated through performance of a push-and-hold touch gesture may have a particular graphical attribute. Furthermore, in some embodiments the user interface system 113 (and a communicatively coupled flight management system 112 and/or auto-flight system 118) may receive and respond to touch-less user inputs (e.g., eye gestures, voice commands, or the like) and touch gestures.

Referring now to FIG. 12, an exemplary screenshot 1200 associated with exemplarily embodied methods to graphically demonstrate automation effects to a user 111, 121, 131, 141 (such as a pilot) is depicted. Current systems fail to clearly show the pilot the effect of changing aircraft performance parameters. Currently, pilots are expected to read text readouts and build a mental picture of the effects, which results in increased pilot workload and potential pilot errors. Embodiments of the invention include a graphical method to present to a user 111, 121, 131, 141 (e.g., a pilot) the effects of individual parameter (e.g., performance parameter) selections.

As shown in FIG. 12, in some embodiments a user interface system 113 (such as a particular touchscreen display 331) graphically presents the effects of modifications to parameters (such as performance parameters) during or before various flight procedures (e.g., flight takeoff, flight cruising, flight ascent, flight descent, approach, or the like). For example, in some embodiments, the touchscreen display 331 is configured to present interactive and dynamically updated content to the user 111, 121, 131, 141 (e.g., the pilot), including: parameter modification content 1210, wherein the parameter modification content 1210 may include a parameter adjuster (such as a parameter adjuster bar (e.g., a "Flex" takeoff parameter adjuster bar 1211) and a parameter slider (e.g., "Flex" takeoff parameter slider 1212)); graphical effect content (such as graphical takeoff effect content 1220 (which may include a takeoff distance indicator 1221 and an available runway indicator 1222) and a graphical climb gradient indicator 1230); flight map modification tools 1240 (such as a map pan/zoom tool 1241, a map rotator 1242, or the like); or the like.

For example, as parameters change performance of the aircraft, the user interface system 113 graphically assists the pilot to attain and maintain situational awareness. In this simplistic case depicted in FIG. 12, the pilot can alter the "Flex" takeoff parameter 1211. In some embodiments, the "Flex" takeoff parameter adjuster bar 1211 can be manipulated by touching and dragging a slider 1212 in one direction or another along the slider bar 1211. For example, dragging the slider 1212 in one direction reduces the cost of operation but results in longer takeoff runs and slower climb outs, whereas dragging the slider 1212 in a different direction might result in a different (such as an opposite) effect. Additionally, in some embodiments, if safety margins are low a visual alert is displayed; for example, if the required takeoff distance exceeds the available runway, then the user interface system 113 presents an alert, such as by highlighting a portion of the touchscreen display 331 in red with a corresponding textual alert.

While FIG. 12 depicts a simplistic case in which the pilot can only modify a "flex" takeoff performance parameter during or before takeoff, it is fully contemplated that in some embodiments a user interface system 113 (such as a particular touchscreen display 331) is configured to graphically present the effects of modifications to multiple parameters during or prior to a particular flight procedure. That is, embodiments of the methodology may apply to various other flight situations, applications, and procedures other than takeoff performance. For example, some embodiments may include similar methodology to graphically present to the user 111, 121, 131, 141 (e.g., a pilot) any tradeoff, such as tradeoffs between or among time, altitude, fuel, speed or the like. Furthermore, such graphical depictions aid a user 111, 121, 131, 141 (e.g., a pilot) in quickly understanding and visualizing the effects of modifying parameters or changing goals.

Referring now to FIG. 13, an exemplary screenshot 1300 associated with exemplarily embodied methods to resolve pilot goal performance conflicts is depicted. Currently, when a pilot directs a currently implemented FMS to complete an instruction that is not possible (such as due to a performance restriction (e.g., when the aircraft cannot climb to a requested altitude because of weight)), the currently implemented system simply states "unable-Alt" (unable-altitude) without providing a reason or without providing the pilot with an achievable performance. This problem is further exacerbated when a pilot makes a complex request of a currently implemented FMS because the pilot may not be able to determine what specific factor(s) is attributable to the lack of achievability. Embodiments of the invention leverage textual and graphical feedback to assist the user 111, 121, 131, 141 (e.g., the pilot) de-conflict goals when automation (e.g., automation of the flight managements system 112 and/or the auto-flight system 118) indicates that aircraft cannot comply with a user request.

As shown in FIG. 13, in some embodiments a user interface system 113 (such as a particular touchscreen display 331) is configured to present textual and graphical feedback to the user 111, 121, 131, 141 (e.g., the pilot) including: textual feedback 1310 (such as one or more selectable solution options 1311, 1312 configured to resolve conflicts between goals or constraints); graphical feedback 1320 (such as a goal conflict indicator); or the like.

Still referring to FIG. 13, the exemplary screenshot 1300 illustrates an example of resolving pilot goal performance conflicts of some embodiments of the invention. For example, as shown in FIG. 13, the pilot has requested the automation (of the flight management system 112 and/or the auto-flight system 118) to climb to a particular altitude (e.g., FL370 (flight level 370)) by the BARTIN waypoint intersection; however, this results in a goal or constraint conflict because a physical limitation (e.g., a performance profile, aircraft weight, or the like) would result in constraint violation to achieve the requested altitude goal. In some embodiments, though, the flight management system 112 and/or the auto-flight system 118 are configured to resolve the goal or constraint conflict by outputting (for presentation to the user 111, 121, 131, 141) one or more resolutions (e.g., one or more selectable solution options 1311, 1312), which are solutions to the requested goal, wherein the solutions neither violate other constraints nor conflict with other goals. That is, for example, the flight management system 112 and/or the auto-flight system 118 determine and suggest one or more alternative solutions which achieve the requested goal efficiently (or which achieve an acceptable alternative goal efficiently).

As depicted in FIG. 13, in some embodiments, the user interface system 113 (e.g., the touchscreen display system 331), the flight management system 112, and/or the auto-flight system 118 are configured to perform a method for resolving pilot goal performance conflicts. For example, in some embodiments, the method includes outputting or presenting a conflict indication, such as a message to denote a pilot goal conflict. For example, in particular embodiments, the message includes a) a textual description of the conflict within the textual feedback 1310 portion (such as "Unable to achieve pilot constraint crossing altitude" as depicted in FIG. 13) and b) a goal conflict indicator or icon (e.g. 1320). Additionally, the method may include outputting or presenting a rationale for the conflict (such as "Reason Aircraft Performance Limitation" within the textual feedback 1310 portion as depicted in FIG. 13). Furthermore, the method may include suggesting, outputting, or presenting a description of solutions to the conflict. For example, the solutions may include a) a textual description of the solutions (e.g. 1311, 1312) within the textual feedback 1310 portion and b) a graphical depiction of the solutions (e.g., 1311, 1312) as shown in FIG. 13. The textual description of possible solutions (1311, 1312) may include: a) an indication or description that a first particular solution (e.g., 1311) is the solution closest to the original pilot request (e.g., the solution 1311 includes a description that the solution 1311 is based upon a "Max Climb" calculation or goal, and as such, would be the closest alternative to achieving the originally requested but unachievable altitude goal); and b) an indication or description that an additional particular solution (e.g., 1312) is an optimized solution (e.g., based upon fuel, time, or the like), wherein the additional particular solution (e.g., 1312) includes a description that it is based upon an "Efficient Climb" optimization calculation, as exemplarily shown in FIG. 13.

While the exemplary embodiment illustrated in FIG. 13 only shows a situation involving one conflicting goal, in some embodiments, the system is configured to support and resolve multiple conflicting goals, such as conflicting goals of fuel limit and arrival times. In some embodiments, if the multiple goals are conflicting, the solution set is expanded to include all likely solutions. Upon determining the solution set of all likely solutions, the system is configured to output or present one, some, or all of the likely solutions to the user 111, 121, 131, 141 (e.g., a pilot) for user selection. If no solutions are acceptable to the user (or if the solution set comprises a null set (i.e., no solution)), then, the pilot may manually set a new goal by manipulating (e.g., touching and dragging) the flight path selector (e.g., the vertical flight path selector 621), and the effects (e.g., fuel, time etc.) of the manual change may be dynamically presented as the pilot drags the flight path selector (e.g., 621). Additionally, if an automation generated lateral flight plan change would allow for the retention of a pilot goal (for example, by "cutting a corner" of the lateral flight path), the automation may suggest a lateral reroute, although the pilot can disable lateral reroutes if desired. Such a flight allows for more flexibility in "free flight" or "autonomous" operation.

Figure 14:
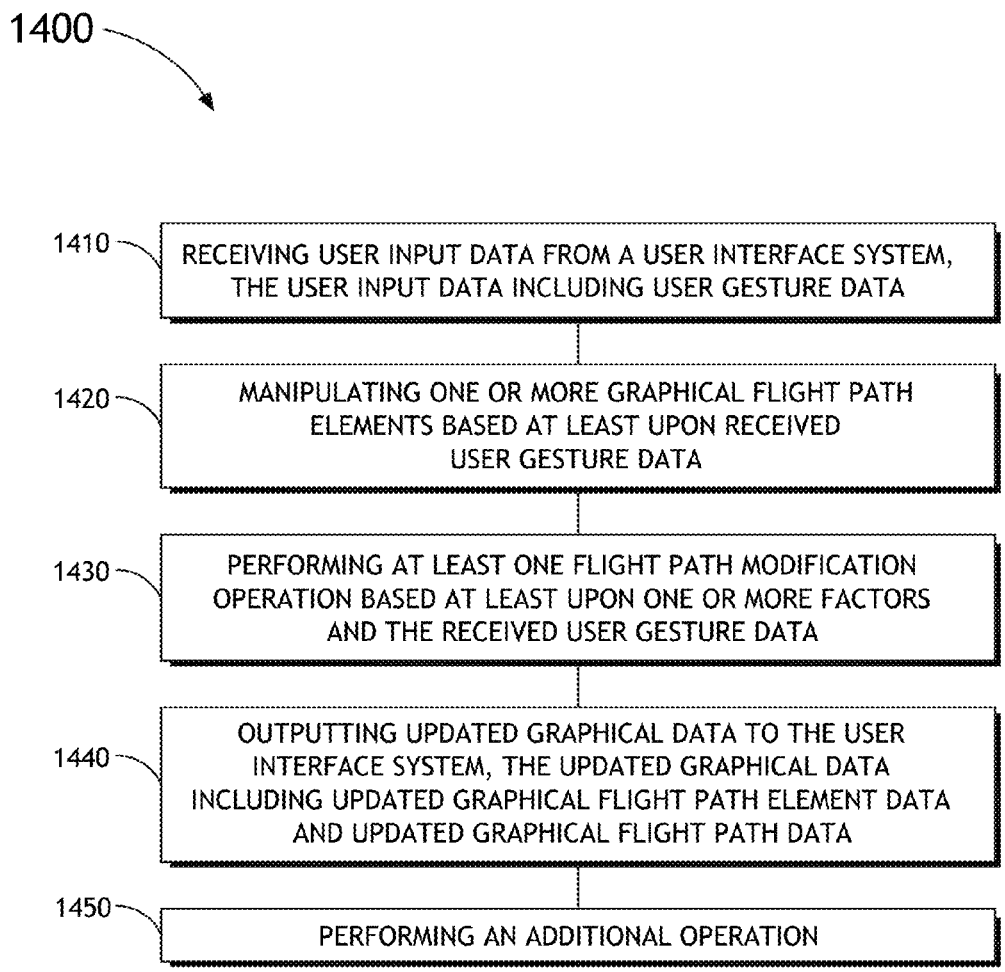
FIG. 14 shows a flow diagram of an exemplary method of some embodiments.

Referring now to FIG. 14, an embodiment of the invention includes a method 1400. It is contemplated that embodiments of the method 1400 can be performed by a computing device (such as a computing device of the aircraft 110 (e.g., the flight management system 112, the auto-flight system 118, the user interface system 113 (which may include one or more touch screen displays 331, the touchscreen flight mode control panel 450, or the like), a hybrid FMS/auto-flight system, or the like), a computing device of the communication station 130, a computing device of the data processing system 132, a computing device of the network operations center 122, a computing device connected to the network 124, a computing device of another vehicle 140, or the like); at least one component, integrated circuit, controller, processor, or module of a computing device; software or firmware executed on the computing device; other computing devices; other computer components; or on other software, firmware, or middleware of a system topology 100; some combination thereof; or the like. The method 1400 can include any or all of steps 1410, 1420, 1430, 1440 and/or 1450, and it is contemplated that the method 1400 includes additional steps or operations as disclosed throughout, but not explicitly set forth in this paragraph. Further, it is fully contemplated that the steps of the method 1400 can be performed concurrently, sequentially, or in a non-sequential order. Likewise, it is fully contemplated that the method 1400 can be performed prior to, concurrently, subsequent to, or in combination with the performance of one or more steps or operations disclosed throughout.

Embodiments of the method 1400 include a step 1410, wherein the step 1410 comprises receiving user input data from a user interface system, the user input data including user gesture data. Embodiments of the method 1400 also include a step 1420, wherein the step 1420 comprises manipulating one or more graphical flight path elements based at least upon received user gesture data. In some embodiments, the one or more graphical flight path elements may include a lateral flight path selector, a vertical flight path selector, a waypoint, or the like. Embodiments of the method 1400 further include a step 1430, wherein the step 1430 comprises performing at least one flight path modification operation based at least upon one or more factors and the received user gesture data. Additionally, embodiments of the method 1400 include a step 1440, wherein the step 1440 comprises outputting updated graphical data to the user interface system, the updated graphical data including updated graphical flight path element data and updated graphical flight path data. In some embodiments, the user interface receives the updated graphical flight path data and graphically presents information to a particular user in substantially real time. Some embodiments of the method 1400 further include a step 1450, wherein the step 1450 comprises performing at least one additional operation, such as disclosed throughout.

Figure 15:
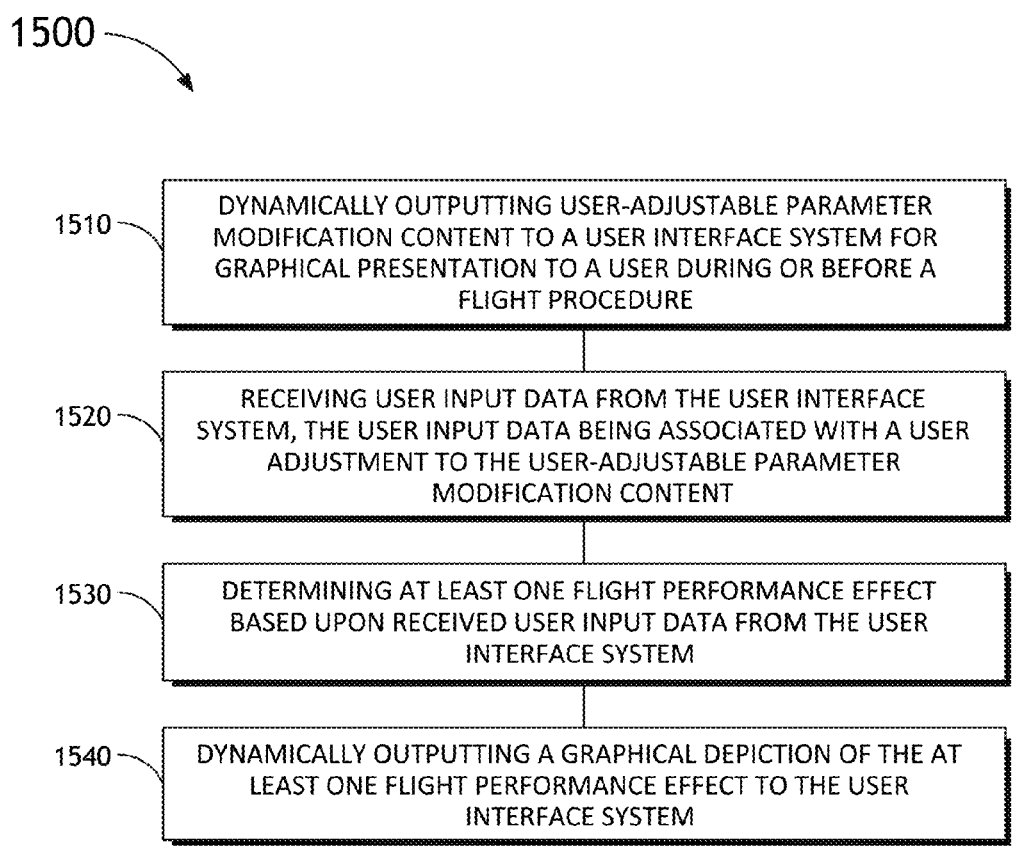
FIG. 15 shows a flow diagram of a further exemplary method of some embodiments.

Referring now to FIG. 15, an embodiment of the invention includes a method 1500. It is contemplated that embodiments of the method 1500 can be performed by a computing device (such as a computing device of the aircraft 110 (e.g., the flight management system 112, the auto-flight system 118, the user interface system 113 (which may include one or more touch screen displays 331, the touchscreen flight mode control panel 450, or the like), a hybrid FMS/auto-flight system, or the like), a computing device of the communication station 130, a computing device of the data processing system 132, a computing device of the network operations center 122, a computing device connected to the network 124, a computing device of another vehicle 140, or the like); at least one component, integrated circuit, controller, processor, or module of a computing device; software or firmware executed on the computing device; other computing devices; other computer components; or on other software, firmware, or middleware of a system topology 100; some combination thereof; or the like. The method 1500 can include any or all of steps 1510, 1520, 1530, and/or 1540, and it is contemplated that the method 1500 includes additional steps or operations as disclosed throughout, but not explicitly set forth in this paragraph. Further, it is fully contemplated that the steps of the method 1500 can be performed concurrently, sequentially, or in a non-sequential order. Likewise, it is fully contemplated that the method 1500 can be performed prior to, concurrently, subsequent to, or in combination with the performance of one or more steps or operations disclosed throughout.

Embodiments of the method 1500 include a step 1510, wherein the step 1510 comprises dynamically outputting user-adjustable parameter modification content to a user interface system for graphical presentation to a user during or before a flight procedure. Embodiments of the method 1500 also include a step 1520, wherein the step 1520 comprises receiving user input data from the user interface system, the user input data being associated with a user adjustment to the user-adjustable parameter modification content. Embodiments of the method 1500 further include a step 1530, wherein the step 1530 comprises determining at least one flight performance effect based upon received user input data from the user interface system. Additionally, embodiments of the method 1500 include a step 1540, wherein the step 1540 comprises dynamically outputting a graphical depiction of the at least one flight performance effect to the user interface system. Additionally, some embodiments of the method 1500 further include a step of performing at least one additional operation, such as disclosed throughout.

Figure 16:
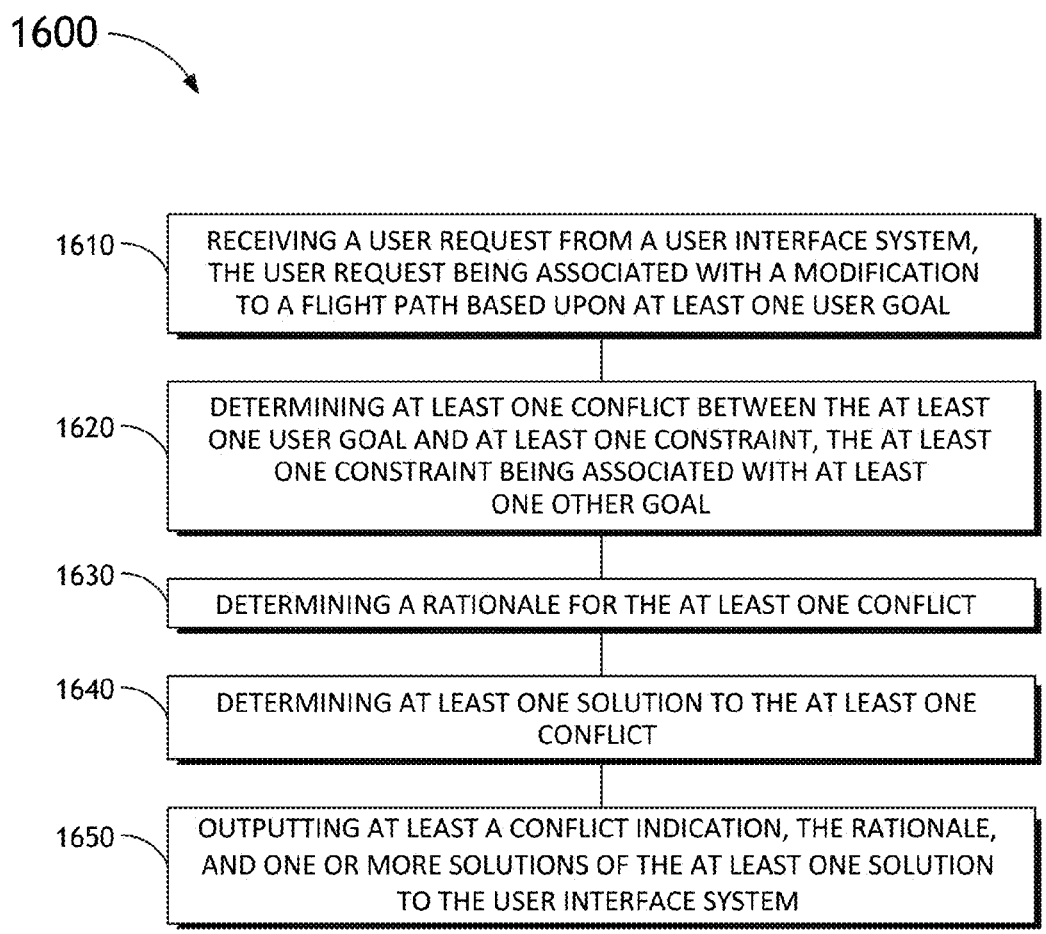
FIG. 16 shows a flow diagram of a further exemplary method of some embodiments.

Referring now to FIG. 16, an embodiment of the invention includes a method 1600. It is contemplated that embodiments of the method 1600 can be performed by a computing device (such as a computing device of the aircraft 110 (e.g., the flight management system 112, the auto-flight system 118, the user interface system 113 (which may include one or more touch screen displays 331, the touchscreen flight mode control panel 450, or the like), a hybrid FMS/auto-flight system, or the like), a computing device of the communication station 130, a computing device of the data processing system 132, a computing device of the network operations center 122, a computing device connected to the network 124, a computing device of another vehicle 140, or the like); at least one component, integrated circuit, controller, processor, or module of a computing device; software or firmware executed on the computing device; other computing devices; other computer components; or on other software, firmware, or middleware of a system topology 100; some combination thereof; or the like. The method 1600 can include any or all of steps 1610, 1620, 1630, 1640 and/or 1650, and it is contemplated that the method 1600 includes additional steps or operations as disclosed throughout, but not explicitly set forth in this paragraph. Further, it is fully contemplated that the steps of the method 1600 can be performed concurrently, sequentially, or in a non-sequential order. Likewise, it is fully contemplated that the method 1600 can be performed prior to, concurrently, subsequent to, or in combination with the performance of one or more steps or operations disclosed throughout.

Embodiments of the method 1600 include a step 1610, wherein the step 1610 comprises receiving a user request from a user interface system, the user request being associated with a modification to a flight path based upon at least one user goal. Embodiments of the method 1600 also include a step 1620, wherein the step 1620 comprises determining at least one conflict between the at least one user goal and at least one constraint, the at least one constraint being associated with at least one other goal. Embodiments of the method 1600 further include a step 1630, wherein the step 1630 comprises determining a rationale for the at least one conflict. Additionally, embodiments of the method 1600 include a step 1640, wherein the step 1640 comprises determining at least one solution to the at least one conflict. Some embodiments of the method 1600 further include a step 1650, wherein the step 1650 comprises outputting at least a conflict indication, the rationale, and one or more solutions of the at least one solution to the user interface system. Additionally, some embodiments of the method 1600 further include a step of performing at least one additional operation, such as disclosed throughout.

Additionally, in some embodiments, the method 1600 further includes exemplary additional operations such as steps for allowing a user to free set a new solution with corresponding costs and/or benefits. For example, the method 1600 may include determining that a user has performed a free set operation (e.g, a free set or a free drop). The free set operation may be associated with a user free set flight path modification having at least one cost and at least one benefit. Similarly, the method 1600 may include performing a cost-benefit analysis. Furthermore, the method 1600 ma may include setting the flight path based at least upon the at least one goal, the at least one constraint, the at least one cost, and the at least one benefit.

In the present disclosure, the methods disclosed may be implemented as sets of instructions or software readable, recognizable, or detectable by a device. Further, it is understood that the specific order or hierarchy of steps in the methods disclosed are examples of exemplary approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

What is claimed is:

1. A method for resolving goal conflicts of an aircraft, comprising:
   receiving a user request from a user interface system, the user request being associated with a modification to a flight path based upon at least one user goal;
   determining at least one conflict between the at least one user goal and at least one constraint, the at least one constraint being associated with at least one other goal;
   determining a rationale for the at least one conflict;
   determining at least one solution to the at least one conflict; and
   outputting at least a conflict indication, the rationale, and one or more solutions of the at least one solution to the user interface system.

2. The method of claim 1, wherein the conflict indication includes a textual description and a graphical goal conflict indicator.

3. The method of claim 1, wherein the one or more solutions are configured to be presented to the user by the user interface system, and wherein each of the one or more solutions includes a textual description and a graphical depiction.

4. The method of claim 1, further comprising:
   receiving a user-selected solution from the user interface system, wherein the user-selected solution comprises a solution selected by the user from the one or more solutions upon outputting at least the conflict indication, the rationale, and the one or more solutions of the at least one solution to the user interface system.

5. The method of claim 1, wherein the at least one conflict comprises a plurality of conflicts.

6. The method of claim 1, wherein the user request comprises a pilot request, and wherein the one or more solutions include at least one of a solution closest to the pilot request or an optimized solution.

7. The method of claim 1, further comprising:
   determining that the user has performed a free set operation upon outputting at least the conflict indication, the rationale, and the one or more solutions of the at least one solution to the user interface system.

8. The method of claim 7, wherein the free set operation is associated with a user free set flight path modification having at least one cost and at least one benefit.

9. The method of claim 8, further comprising:
   performing a cost-benefit analysis; and
   outputting a new solution to the user interface system upon determining that the user has performed the free set operation.

10. The method of claim 9, further comprising:
    setting the flight path.

11. The method of claim 9, further comprising:
    setting the flight path based at least upon the at least one goal, the at least one constraint, the at least one cost, and the at least one benefit.

* * * * *